(12) United States Patent
Ito et al.

(10) Patent No.: US 10,741,029 B2
(45) Date of Patent: Aug. 11, 2020

(54) RECEIVING APPARATUS AND METHOD, TRANSMITTING APPARATUS AND METHOD, AND PROGRAM

(71) Applicant: SONY CORPORATION, Tokyo (JP)

(72) Inventors: Osamu Ito, Tokyo (JP); Ikuo Yamano, Tokyo (JP); Ryo Yokoyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/323,647

(22) PCT Filed: Aug. 29, 2017

(86) PCT No.: PCT/JP2017/030857
§ 371 (c)(1),
(2) Date: Feb. 6, 2019

(87) PCT Pub. No.: WO2018/047666
PCT Pub. Date: Mar. 15, 2018

(65) Prior Publication Data
US 2019/0180578 A1    Jun. 13, 2019

(30) Foreign Application Priority Data

Sep. 12, 2016  (JP) ................................ 2016-177335

(51) Int. Cl.
*G08B 6/00* (2006.01)
*G05D 19/02* (2006.01)
(Continued)

(52) U.S. Cl.
CPC .............. *G08B 6/00* (2013.01); *A41D 1/00* (2013.01); *A41D 13/00* (2013.01);
(Continued)

(58) Field of Classification Search
None
See application file for complete search history.

(56) References Cited

U.S. PATENT DOCUMENTS 5,450,068 A * 9/1995 Steffen .................... E02F 9/205
                                                            172/2
6,188,916 B1 * 2/2001 Noda .................... H04W 88/02
                                                            370/337
(Continued)

*Primary Examiner* — John F Mortell
(74) *Attorney, Agent, or Firm* — Paratus Law Group, PLLC

(57) ABSTRACT

The present disclosure relates to a receiving apparatus and method, a transmitting apparatus and method, and a program, which can vibrate a device in a specific area of a receiving area. An example, in which users wearing respective wearable receiving apparatuses are freely moving in the receiving area, is shown. A directional transmitting device unit transmits an area designation signal, and the reachable range of the signal is shown as a beam irradiation area. Only the user in the beam irradiation area receives the area designation signal transmitted by the directional transmitting device unit. The present disclosure can be applied to, for example, a video projection system that vibrates a receiving apparatus by transmission and reception of a directional wireless signal in the specific area where the video is projected.

19 Claims, 18 Drawing Sheets

(51) Int. Cl.
*G08C 17/02* (2006.01)
*G08C 23/04* (2006.01)
*G08C 23/02* (2006.01)
*A41D 1/00* (2018.01)
*A41D 13/00* (2006.01)
*H04N 21/43* (2011.01)
*G08B 25/10* (2006.01)
*H04N 21/414* (2011.01)
*A63J 25/00* (2009.01)
*H04N 21/41* (2011.01)
*A41D 1/02* (2006.01)
*A41D 1/04* (2006.01)

(52) U.S. Cl.
CPC ......... *A41D 13/0002* (2013.01); *G05D 19/02* (2013.01); *G08B 25/10* (2013.01); *G08C 17/02* (2013.01); *H04N 21/4307* (2013.01); *A41D 1/02* (2013.01); *A41D 1/04* (2013.01); *A63J 25/00* (2013.01); *G08C 23/02* (2013.01); *G08C 23/04* (2013.01); *H04N 21/4126* (2013.01); *H04N 21/41415* (2013.01)

(56) References Cited

U.S. PATENT DOCUMENTS

| | | | | |
|---|---|---|---|---|
| 6,389,287 | B1* | 5/2002 | Smith | H04L 45/122 |
| | | | | 455/413 |
| 6,850,782 | B2* | 2/2005 | Bright | G06F 3/016 |
| | | | | 340/7.6 |
| 10,057,231 | B2* | 8/2018 | Pritchard | H04W 12/06 |
| 2005/0075072 | A1* | 4/2005 | Apitzsch | A61H 19/00 |
| | | | | 455/41.2 |
| 2014/0218184 | A1* | 8/2014 | Grant | G08B 6/00 |
| | | | | 340/407.1 |
| 2017/0076565 | A1* | 3/2017 | Saboune | G06F 3/016 |

* cited by examiner

RECEIVING APPARATUS AND METHOD, TRANSMITTING APPARATUS AND METHOD, AND PROGRAM

CROSS REFERENCE TO PRIOR APPLICATION

This application is a National Stage Patent Application of PCT International Patent Application No. PCT/JP2017/030857 (filed on Aug. 29, 2017) under 35 U.S.C. § 371, which claims priority to Japanese Patent Application No. 2016-177335 (filed on Sep. 12, 2016), which are all hereby incorporated by reference in their entirety.

TECHNICAL FIELD

The present disclosure relates to a receiving apparatus and method, a transmitting apparatus and method, and a program, and more particularly, to a receiving apparatus and method, a transmitting apparatus and method, and a program which are adapted to vibrate a device in a specific area of a receiving area.

BACKGROUND ART

Conventionally, there has been a device to vibrate (see Patent Document 1)

CITATION LIST

Patent Document

Patent Document 1: Japanese Patent Application Laid-Open No. 2011-59821

SUMMARY OF THE INVENTION

Problems to be Solved by the Invention

There has been an increasing demand for vibrating only a device in a specific area of a receiving area for receiving a wireless signal.

The present disclosure has been made in light of such a situation and can vibrate a device in a specific area of a receiving area.

Solutions to Problems

A receiving apparatus according to an aspect of the present technology includes: a first wireless receiving unit that receives a first wireless signal including a waveform of vibration; a second wireless receiving unit that receives a second wireless signal including control information for controlling ON/OFF of the vibration, in a predetermined area; a waveform generating unit that generates, on the basis of the control information included in the second wireless signal received by the second wireless receiving unit, the waveform of the vibration from the first wireless signal received by the first wireless receiving unit; and a vibrating unit that produces the vibration according to the waveform generated by the waveform generating unit.

The first wireless receiving unit can receive the first wireless signal by broadcasting.

The second wireless receiving unit can receive the second wireless signal by using an IR signal.

The second wireless receiving unit can receive the second wireless signal by using an ultrasonic signal.

The first wireless signal has information indicating presence or absence of place restriction for generating the waveform of the vibration, the waveform generating unit can generate, on the basis of the control information included in the second wireless signal received by the second wireless receiving unit, the waveform of the vibration from the first wireless signal received by the first wireless receiving unit in a case where the presence of the place restriction is indicated in the first wireless signal, and the waveform generating unit can generate the waveform of the vibration from the first wireless signal received by the first wireless receiving unit in a case where the absence of the place restriction is indicated in the first wireless signal.

The receiving apparatus can further include: a relay control unit that controls relay of the second wireless signal received by the second wireless receiving unit; and a wireless transmitting unit that transmits, to an outside, the second wireless signal whose relay is controlled by the relay control unit.

The receiving apparatus is formed to be wearable and worn on a user.

The predetermined area is spread in a direction the same as a projection direction in which a video is projected by a projector.

A receiving method according to an aspect of the present technology includes: receiving, by a receiving apparatus, a first wireless signal including a waveform of vibration; receiving, by the receiving apparatus, a second wireless signal including control information for controlling ON/OFF of the vibration, in a predetermined area; generating, by the receiving apparatus, on the basis of the control information included in the second wireless signal received, the waveform of the vibration from the first wireless signal received; and producing, by the receiving apparatus, the vibration according to the waveform generated.

A program according to an aspect of the present technology causes a computer to function as: a first wireless receiving unit that receives a first wireless signal including a waveform of vibration; a second wireless receiving unit that receives a second wireless signal including control information for controlling ON/OFF of the vibration, in a predetermined area; a waveform generating unit that generates, on the basis of the control information included in the second wireless signal received by the second wireless receiving unit, the waveform of the vibration from the first wireless signal received by the first wireless receiving unit; and a vibrating unit that produces the vibration according to the waveform generated by the waveform generating unit.

A transmitting apparatus according to another aspect of the present technology includes: a waveform generating unit that generates a waveform of vibration for vibrating a receiving apparatus; a first wireless transmitting unit that modulates the waveform generated by the waveform generating unit and transmits the modulated waveform as a first wireless signal; a control information generating unit that generates control information for controlling ON/OFF of the vibration; and a second wireless transmitting unit that modulates the control information generated by the control information generating unit and transmits, to a predetermined area, the modulated control information as a second wireless signal.

The first wireless transmitting unit can transmit the first wireless signal by broadcasting.

The second wireless transmitting unit can transmit the second wireless signal by using an IR signal.

The second wireless transmitting unit can transmit the second wireless signal by using an ultrasonic signal.

The first wireless signal includes information indicating presence or absence of place restriction for generating the waveform of the vibration, which is controlled by the control information.

The receiving apparatus is formed to be wearable and worn on a user.

The transmitting apparatus can further include a projector that projects a video in a projection area spread in the same direction as the predetermined area.

A transmitting method according to another aspect of the present technology includes: generating, by a transmitting apparatus, a waveform of vibration for vibrating a receiving apparatus; modulating, by the transmitting apparatus, the waveform generated and transmitting the modulated waveform as a first wireless signal; generating, by the transmitting apparatus, control information for controlling ON/OFF of the vibration; and modulating, by the transmitting apparatus, the control information generated and transmitting, to a predetermined area, the modulated control information as a second wireless signal.

A program according to another aspect of the present technology causes a computer to function as: a waveform generating unit that generates a waveform of vibration for vibrating a receiving apparatus; a first wireless transmitting unit that modulates the waveform generated by the waveform generating unit and transmits the modulated waveform as a first wireless signal; a control information generating unit that generates control information for controlling ON/OFF of the vibration; and a second wireless transmitting unit that modulates the control information generated by the control information generating unit and transmits, to a predetermined area, the modulated control information as a second wireless signal.

In an aspect of the present technology, the first wireless signal including the waveform of the vibration is received, and the second wireless signal including the control information for controlling ON/OFF of the vibration is received in the predetermined area. Then, on the basis of the control information included in the second wireless signal received, the waveform of the vibration is generated from the first wireless signal received, and the vibration is produced according to the waveform generated.

In another aspect of the present technology, the waveform of the vibration for vibrating the receiving apparatus is generated, the waveform generated is modulated and transmitted as the first wireless signal. Then, the control information for controlling ON/OFF of the vibration is generated, and the control information generated is modulated and transmitted as the second wireless signal to the predetermined area.

Effects of the Invention

According to the present technology, it is possible to vibrate a device in a specific area. In particular, it is possible to vibrate a device in a specific area of a receiving area.

Note that the effects described in this specification are merely examples, the effects of the present technology are not limited to the effects described in this specification, and there may be additional effects.

MODES FOR CARRYING OUT THE INVENTION

Hereinafter, modes for carrying out the present disclosure (hereinafter, referred to as embodiments) will be described.

<Configuration Example of Video Projection System>

Figure 1:
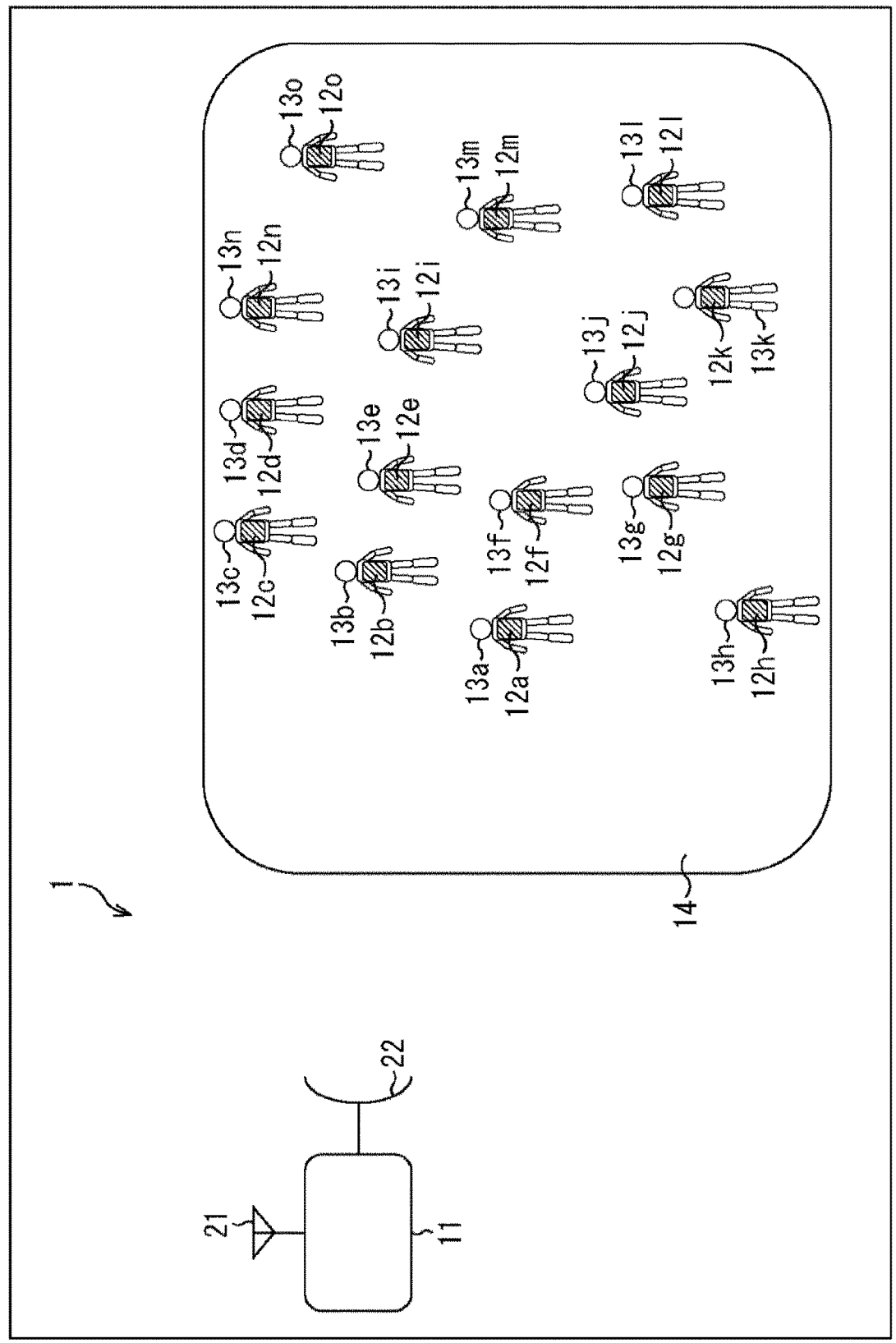
FIG. 1 is a diagram showing a configuration example of a video projection system to which the present technology is applied.

FIG. 1 is a diagram showing a configuration example of a video projection system to which the present technology is applied.

In the example in FIG. 1, a video projection system 1 is configured by including a transmitting apparatus 11, wearable receiving apparatuses 12a to 12o worn on users 13a to 13o, and a receiving area 14. Note that the wearable receiving apparatuses 12a to 12o are referred to as the wearable receiving apparatus 12 unless it is particularly necessary to distinguish them, and the users 13a to 13o are referred to as the user 13 as appropriate unless it is particularly necessary to distinguish them.

The transmitting apparatus 11 is configured to be movable and is configured by including an omnidirectional transmitting device unit 21 and a directional transmitting device unit 22.

The omnidirectional transmitting device unit 21 transmits a broadcasting signal to the receiving area 14. The directional transmitting device unit 22 has a video projection function and transmits a signal for a specific area to the specific area, where a video is projected by the video projection function, of the receiving area 14.

The wearable receiving apparatus 12 is a vest-shaped receiving apparatus worn on the user 13. The wearable receiving apparatus 12 receives the signal from the omnidirectional transmitting device unit 21 and receives the signal from the directional transmitting device unit 22 depending on the position in the receiving area 14. The wearable receiving apparatus 12 has a vibrating unit 31 for vibrating the body of the user 13 and vibrates the body of the user 13 in response to the signal from the omnidirectional transmitting device unit 21 and the signal from the directional transmitting device unit 22.

In other words, in a case where the signal from the directional transmitting device unit 22 is received, the wearable receiving apparatus 12 uses the broadcasting signal to vibrate the body of the user 13. On the other hand, in a case where the signal from the directional transmitting device unit 22 is not received, the broadcasting signal is not used. However, not all the broadcasted signals are based on this determination, but a case where there is an instruction to use the signal from the directional transmitting device unit 22 in the broadcasted signals. For this instruction method, a general-purpose method is used. Hereinafter, the signal in which this instruction is to "use" will be described.

The user 13 is one of a plurality of users who are wearing the wearable receiving apparatuses 12 and freely moving in the receiving area 14. The receiving area 14 is an area that can receive the signal from the omnidirectional transmitting device unit 21.

Figure 2:
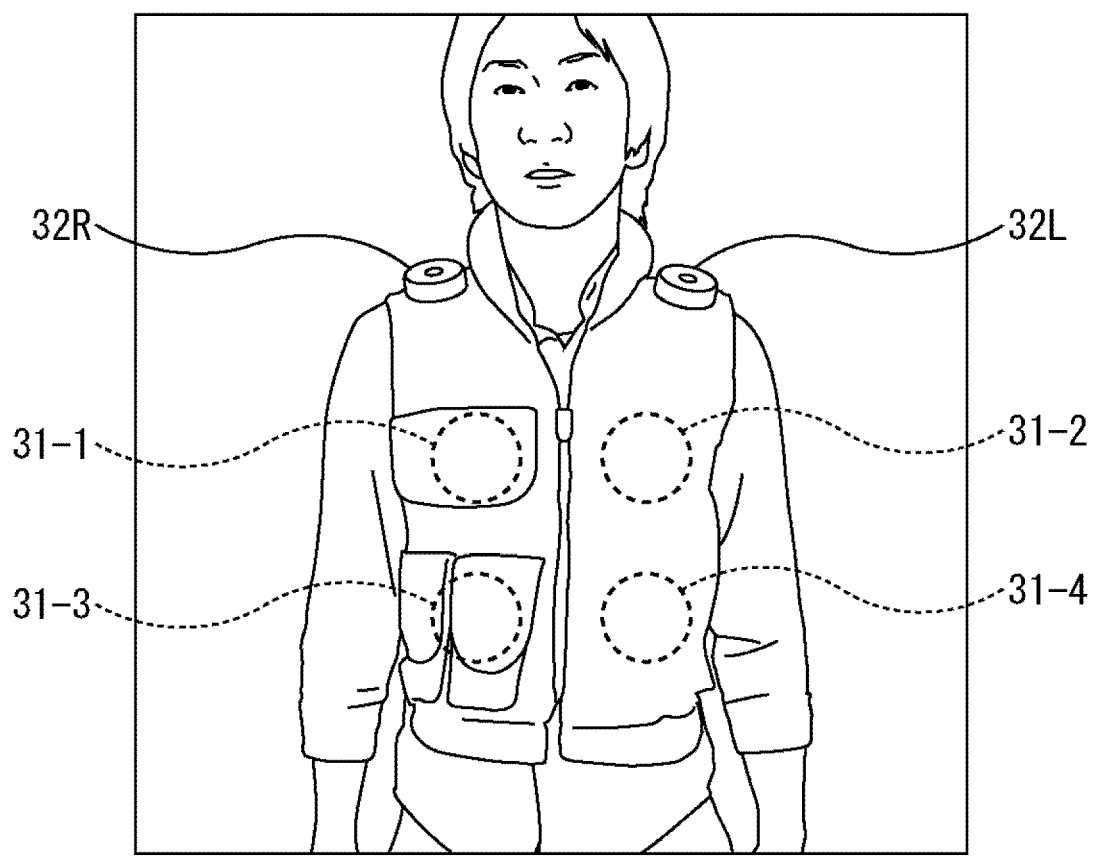
FIG. 2 is a diagram showing a configuration example of the appearance of the wearable receiving apparatus.

FIG. 2 is a diagram showing a configuration example of the appearance of the wearable receiving apparatus 12.

As shown in FIG. 2, the wearable receiving apparatus 12 is configured by a wearable jacket (vest), and vibrating units 31-1 to 31-4 are provided around the chest and abdomen. The vibrating units 31-1 to 31-4 may each vibrate at the same timing or may vibrate at different timings. Moreover, speakers 32R and 32L are provided on the shoulder of the jacket, and the user 13 can enjoy the realistic feeling of tactile sensation and sounds by the vibrations of the vibrating units 31-1 to 31-4 and the sounds from the speakers 32R and 32L.

Note that the vibrating units 31-1 to 31-4 are referred to as the vibrating unit 31 unless it is particularly necessary to distinguish them. The example in FIG. 2 shows an example of the configuration with four vibrating units 31, but the number is not limited and may be a different plural number such as six or eight. It is desirable that the same number of vibrating units 31 be provided on the left and right, in other words, the vibrating units 31 be configured with an even number. Moreover, the speakers 32R and 32L are also referred to as the speaker 32 unless it is particularly necessary to distinguish them.

Figure 3:
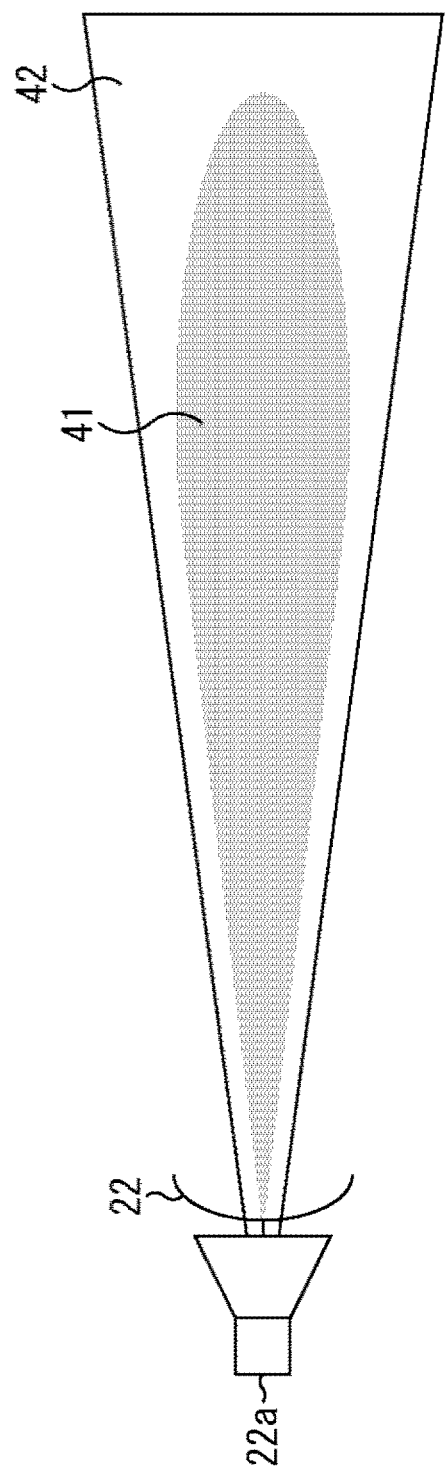
FIG. 3 is a diagram showing the configuration of the directional transmitting device unit.

FIG. 3 is a diagram showing the configuration of the directional transmitting device unit. The example in FIG. 3 shows an image viewed from the top. In the example in FIG. 3, the directional transmitting device unit 22 includes a projector 22a as the video projection function. In addition, a beam irradiation area 41 is an area to which an area designation signal is transmitted from the directional transmitting device unit 22.

The projector 22a is a projection apparatus that delivers a video in the same area as the beam irradiation area 41. A projection area 42 is an area where the video is projected by the projector 22a.

In other words, the beam irradiation area 41 and the projection area 42 spread in the same direction. Although the two areas overlap, strictly speaking, only the limited area for the video contents being projected is the beam irradiation area 41. However, the beam irradiation area 41 may be a wide area depending on the video contents.

Figure 4:
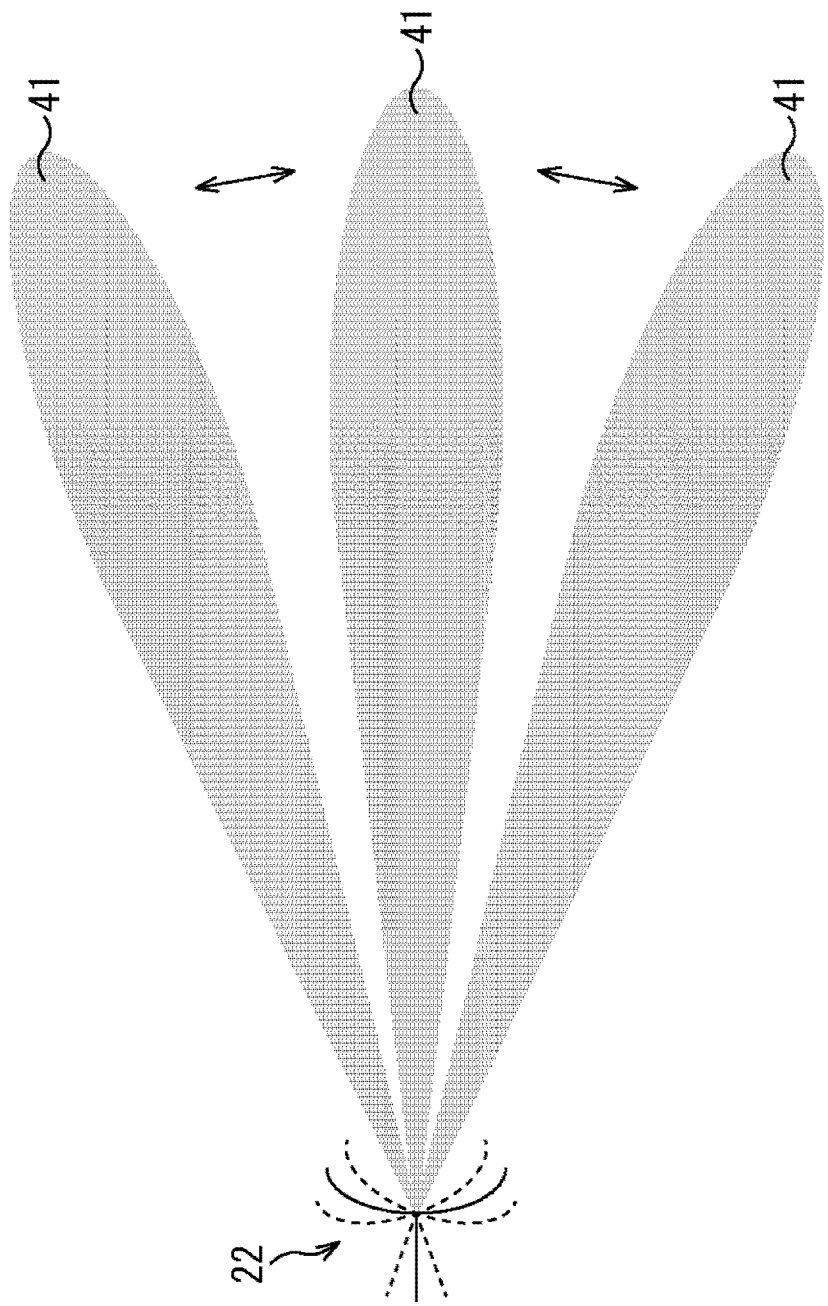
FIG. 4 is a diagram illustrating the operation of the directional transmitting device unit.

FIG. 4 is a diagram illustrating the operation of the directional transmitting device unit. As shown in FIG. 4, the directional transmitting device unit 22 can change the direction of transmitting the area designation signal. An example of the way of changing the direction is a method of rotating a table on which the directional transmitting device unit 22 is installed, but the way of changing the direction is not limited to this method. Moreover, although not shown, the projector 22a is also installed on the same rotary table and can move on the same axis. As the directional transmitting device unit 22 moves, the beam irradiation area 41 also moves together.

Figure 5:
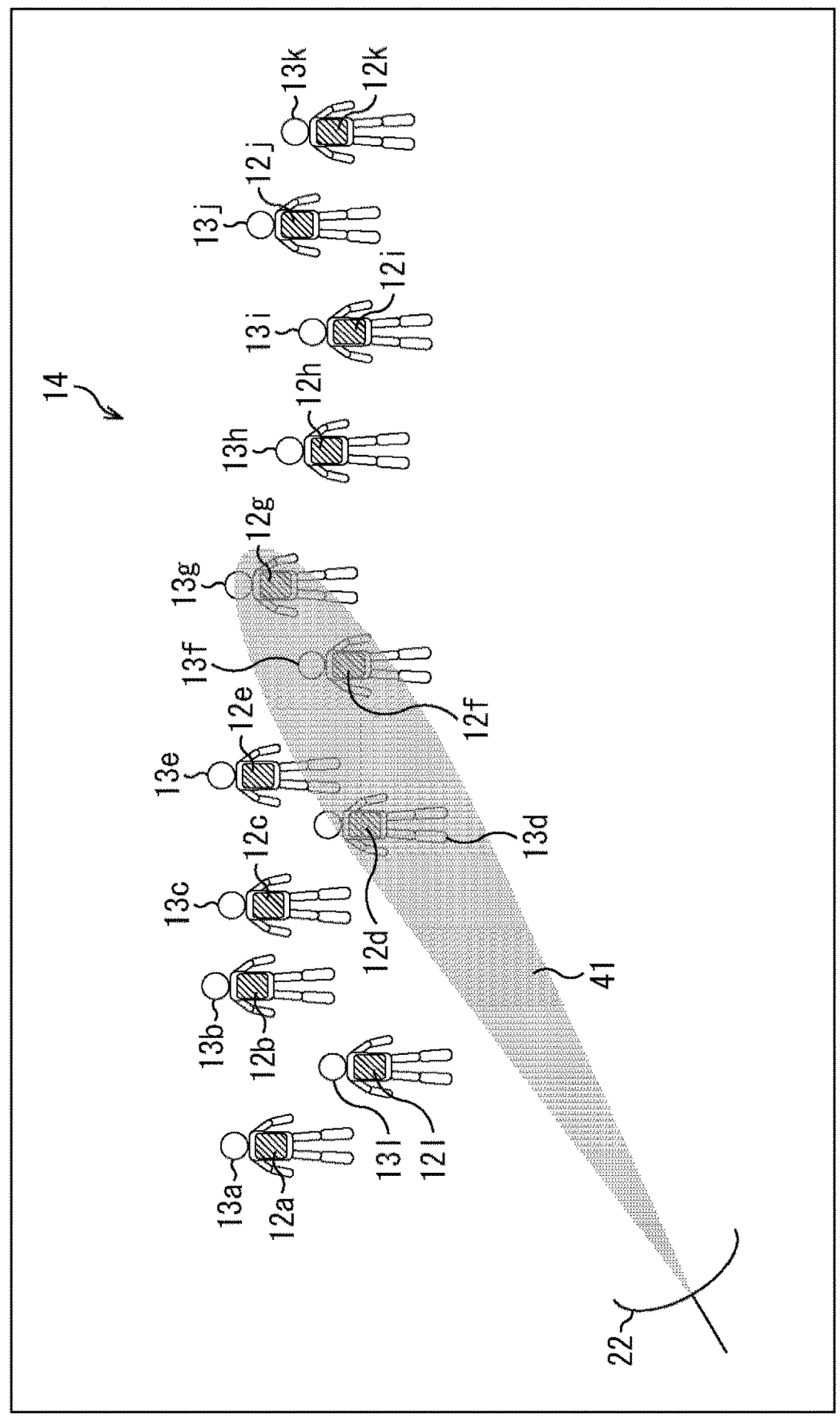
FIG. 5 is a diagram illustrating a state of the area designation.

FIG. 5 is a diagram illustrating a state of the area designation. The example in FIG. 5 shows the interior of the receiving area 14 and shows an example in which the users 13a to 13l wearing the wearable receiving apparatuses 12a to 12l are moving freely in the receiving area 14.

The directional transmitting device unit 22 transmits the area designation signal, and the reachable range of the signal is shown as the beam irradiation area 41. In the example in FIG. 5, the users 13d, 13f and 13g are in the beam irradiation area 41 and receive the area designation signals transmitted by the directional transmitting device unit 22. In reality, in a case where the wearable receiving apparatus 12 is in the beam irradiation area 41, the wearable receiving apparatus 12 receives the signal. However, the signal is received only in a case where a light receiving unit (not shown) of the wearable receiving apparatus 12 is directed to the directional transmitting device unit 22 which is a light source, such as a case where the transmitted signal uses light.

In the example in FIG. 5, in a case where the directional transmitting device unit 22 is moved to be directed to the direction of the user 13a, the wearable receiving apparatus 12a worn on the user 13a receives the signal, and the wearable receiving apparatuses 12d, 12f and 12g of the users 13d, 13f and 13g cannot receive the signals. Moreover, if the user 13d moves to the interior of the beam irradiation area 41 while the directional transmitting device unit 22 is directed to the direction of the user 13a, the wearable receiving apparatuses 12a and 12d of the users 13a and 13d receive the area designation signals.

Figure 6:
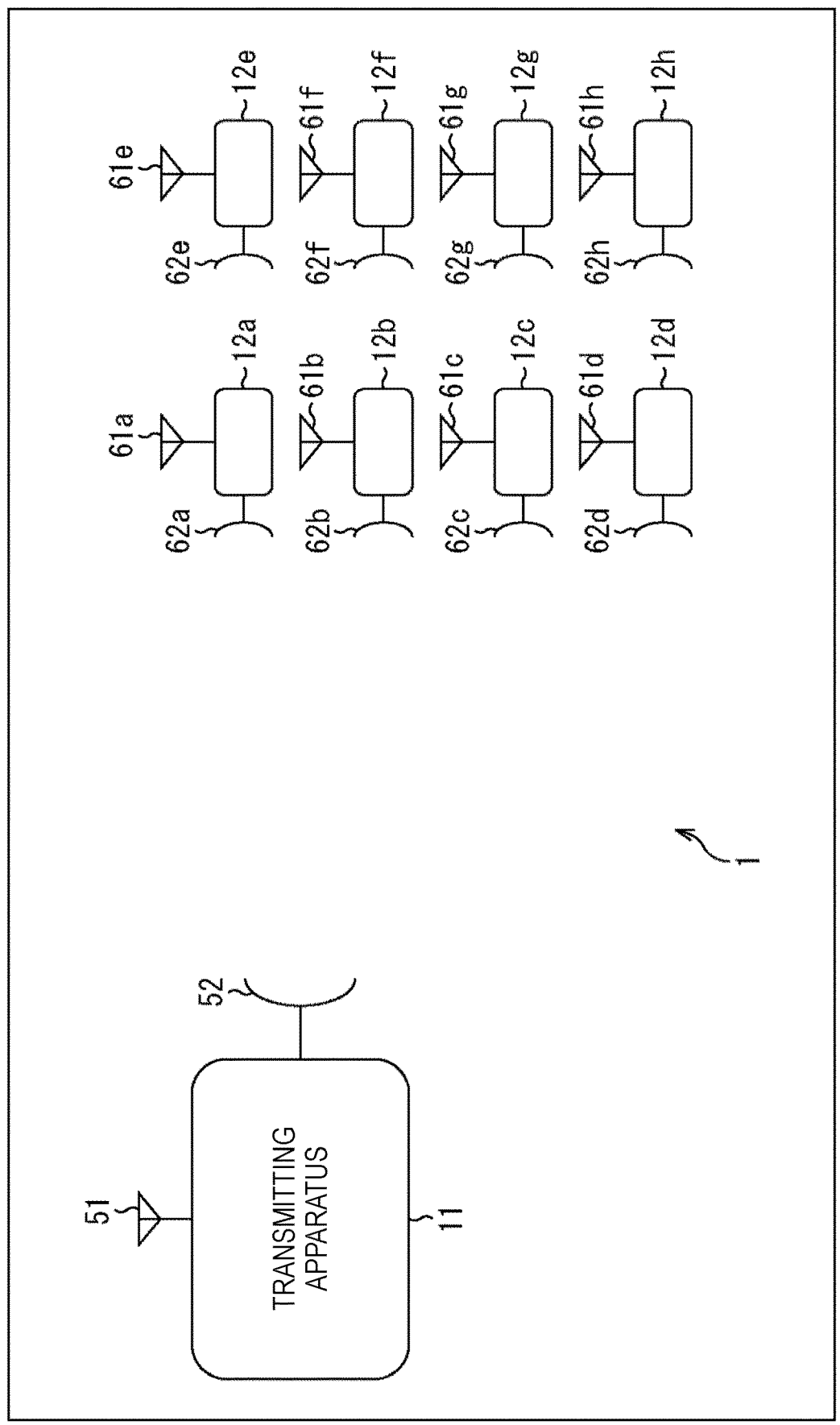
FIG. 6 is a diagram showing configuration examples of the transmitting apparatus and the wearable receiving apparatuses of the video projection system.

FIG. 6 is a diagram showing configuration examples of the transmitting apparatus and the wearable receiving apparatuses of the video projection system.

In the video projection system 1 in FIG. 6, the transmitting apparatus 11 has a first wireless transmitting device unit 51 and a second wireless transmitting device unit 52. The first wireless transmitting device unit 51 basically has the configuration similar to that of the omnidirectional transmitting device unit 21 in FIG. 1 and transmits radio waves. The second wireless transmitting device unit 52 basically has the configuration similar to that of the directional transmitting device unit 22 in FIG. 1 and emits light.

The wearable receiving apparatuses 12a to 12h have first wireless receiving device units 61a to 61h and second wireless receiving device units 62a to 62h, respectively. Note that the first wireless receiving device units 61a to 61h are referred to as the first wireless receiving device unit 61 unless it is particularly necessary to distinguish them, and the second wireless receiving device units 62a to 62h are referred to as the second wireless receiving device unit 62 unless it is particularly necessary to distinguish them.

The first wireless receiving device unit 61 receives the radio waves from the first wireless transmitting device unit 51. The second wireless receiving device unit 62 receives the light from the second wireless transmitting device unit 52.

In other words, the radio waves from the first wireless transmitting device unit 51 are omnidirectionally transmitted, and the first wireless receiving device unit 61 omnidirectionally receives the radio waves. For example, the first wireless transmitting device unit 51 and the first wireless receiving device unit 61 are communicated by broadcast. Accordingly, the communication is established regardless of the posture of the user 13 in the receiving area 14 where the radio waves reach. The light from the second wireless transmitting device unit 52 is emitted with directivity, and the second wireless receiving device 62 receives the light with directivity. Accordingly, the communication is established only in a case where the user 13 is present in the limited range, which is irradiated with the light emitted from the second wireless transmitting device unit 52, and with the posture that the second wireless receiving device unit 62 is directed to the direction of the second wireless transmitting device unit 52 and can receive the light. Note that the communication is not established if there is a shield between the second wireless transmitting device unit 52 and the second wireless receiving device unit 62 because the light is blocked off.

Figure 7:
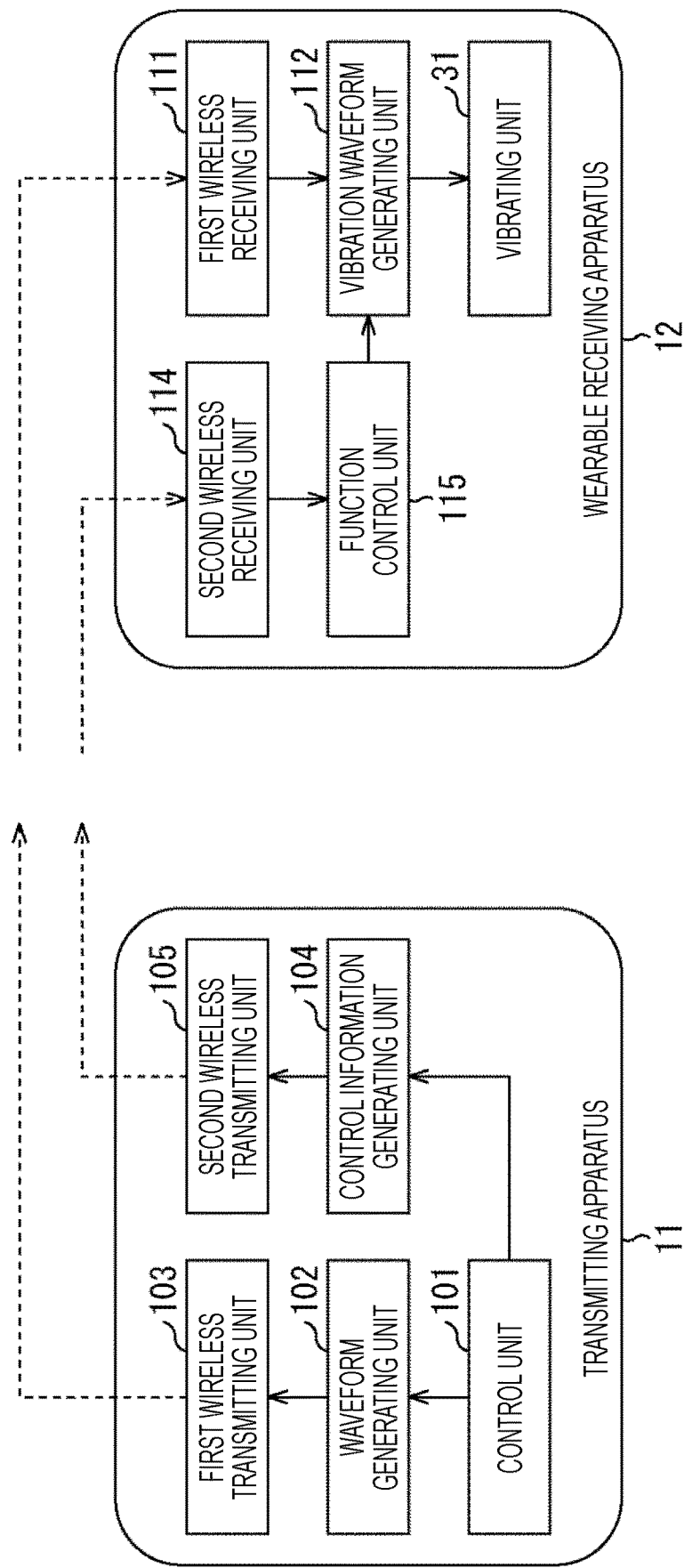
FIG. 7 is a block diagram showing internal configuration examples of the transmitting apparatus and the wearable receiving apparatus.

FIG. 7 is a block diagram showing internal configuration examples of the transmitting apparatus and the wearable receiving apparatus.

In the example in FIG. 7, the transmitting apparatus 11 is configured by including a control unit 101, a waveform generating unit 102, a first wireless transmitting unit 103, a control information generating unit 104 and a second wireless transmitting unit 105.

The wearable receiving apparatus 12 is configured by including a first wireless receiving unit 111, a vibration waveform generating unit 112, the vibrating unit 31, a second wireless receiving unit 114 and a function control unit 115.

The control unit 101 outputs waveform information for vibrating the vibrating unit 31 to the waveform generating unit 102 and outputs a control condition for the function control unit 115 to functionally control to the control information generating unit 104. On the basis of the waveform information from the control unit 101, the waveform generating unit 102 generates a waveform signal for vibrating the vibrating unit 31 and outputs the waveform signal to the first wireless transmitting unit 103. The first wireless transmitting unit 103 corresponds to the first wireless transmitting device unit 51 and modulates the waveform signal from the waveform generating unit 102 to be outputted as a wireless signal.

On the basis of the control condition from the control unit 101, the control information generating unit 104 generates a control signal for the function control unit 115 to perform control operation and outputs the control signal to the second wireless transmitting unit 105. The second wireless transmitting unit 105 corresponds to the second wireless transmitting device unit 52 and modulates the control signal from the control information generating unit 104 to be outputted as a wireless signal.

The first wireless receiving unit 111 corresponds to the first wireless receiving device unit 61, receives and demodulates the wireless signal sent from the first wireless transmitting unit 103, converts the signal into a waveform signal, and outputs the waveform signal to the vibration waveform generating unit 112. On the basis of the control condition from the function control unit 115, the vibration waveform generating unit 112 generates the waveform signal from the first wireless receiving unit 111 as a waveform for vibrating the vibrating unit 31 and outputs the waveform as a vibration waveform signal to the vibrating unit 31.

The vibrating unit 31 vibrates by the vibration waveform signal from the vibration waveform generating unit 112. The second wireless receiving unit 114 corresponds to the second wireless receiving device unit 62, receives and demodulates the wireless signal sent from the second wireless transmitting unit 105, converts the signal into a control signal, and outputs the control signal to the function control unit 115. The function control unit 115 generates the control condition on the basis of the control signal from the second wireless receiving unit 114 and outputs the control condition to the vibration waveform generating unit 112.

To vibrate the vibrating unit 31, the control unit 101 defines the vibration waveform and the control condition and issues an instruction to the waveform generating unit 102 and the control information generating unit 104. At this time, the control unit 101 is in synchronization with the application contents of the entire video projection system (not shown) and issues an instruction suitable for the video being projected by the projector 22a. For example, if the video being projected is a video that strongly hits the user 13, the vibration waveform with which the vibrating unit 31 strongly reacts is instructed. If the video being projected is a video that softly touches the user 13, the vibration waveform with which the vibrating unit 31 softly vibrates is instructed.

Note that, although the details will be described later, in this specification, the determination as to "utilize/not utilize" the control condition from the function control unit 115 in the vibration waveform generating unit 112 is conveyed to the vibration waveform generating unit 112 from the control unit 101 as a starting point via the waveform generating unit 102, the first wireless transmitting unit 103 and the first wireless receiving unit 111. Therefore, even in a case where the communication is not established between the second wireless transmitting unit 105 and the second wireless receiving unit 114, the vibration waveform signal for vibrating the vibrating unit 31 by the determination operation of the vibration waveform generating unit 112 is outputted. Moreover, a plurality of vibrating units 31 may be installed for the vibration waveform generating unit 112.

Figure 8:
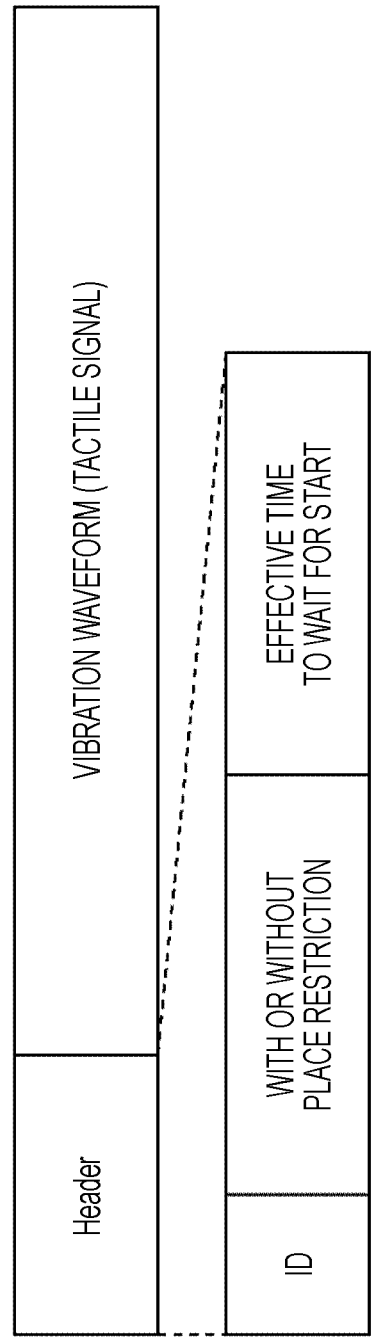
FIG. 8 is a diagram showing an example of a packet format of the signal outputted from the first wireless transmitting unit.

FIG. 8 is a diagram showing an example of a packet format of the signal outputted from the first wireless transmitting unit 103.

The signal in FIG. 8 is constituted by a header and a vibration waveform (tactile signal). Note that one wireless channel is used for one actuator of the vibrating unit 31 in the vibration waveform in the example in FIG. 8.

The header is configured to store information of "ID," "with or without place restriction" and "effective time to wait for start." The "ID" is a packet ID and corresponds to the signal (packet) from the second wireless transmitting unit 105. Note that the same ID may be allocated to the vibration waveforms of different actuators, and the actuators may be subject to common control described next with FIG. 9.

The "with or without place restriction" is information corresponding to Step S52 in FIG. 13 as described later. In other words, this indicates whether or not there is place restriction for generating the waveform stored in this packet. In the case of "with place restriction," the "effective time to wait for start" indicates a time when the vibration waveform reproduction is "first" ON by the information from the second wireless receiving unit 114 after the effective time from the reception of this packet, but the vibration waveform thereof remains OFF. This is a countermeasure against a case where the information from the second wireless receiving unit 114 arrives late by relay. Note that a case of control in which On/Off is repeated is effective because the "first" does not apply.

Figure 9:
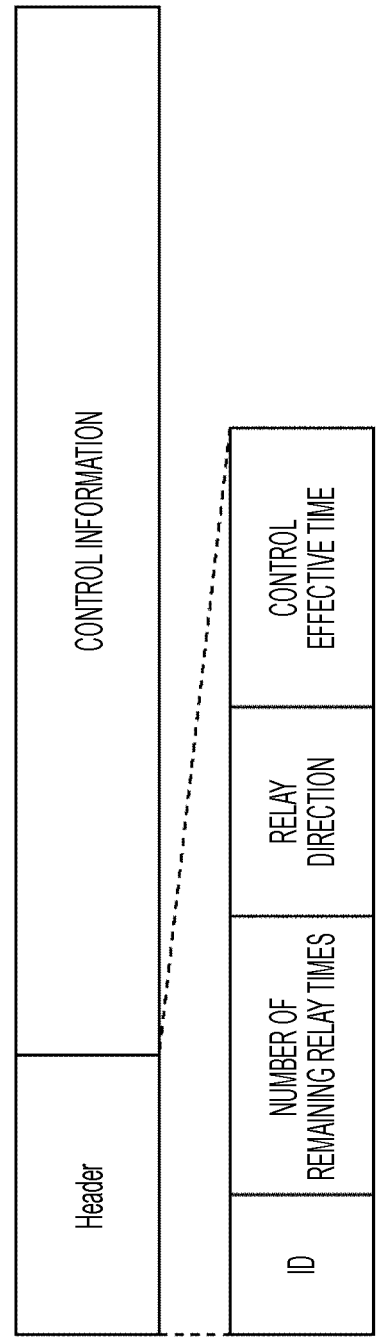
FIG. 9 is a diagram showing an example of a packet format of the signal outputted from the second wireless transmitting unit.

FIG. 9 is a diagram showing an example of a packet format of the signal outputted from the second wireless transmitting unit 105.

The signal in FIG. 9 is constituted by a header and the control information. In the example in FIG. 9, the On/Off state of each actuator of the vibrating unit 31 is conveyed by the control information.

The header is configured to store information of "ID," "the number of remaining relay times," "relay direction" and "control effective time." The "ID" is a packet ID and corresponds to a packet (which can be shared by vibration waveforms of different actuators) from the first wireless transmitting unit 103.

The "the number of remaining relay times" is subtracted by "1" for each relay by each user. The wearable receiving apparatus 12, which has received the packet transmitted as "0" from the transmitting apparatus 11 or with "0" by subtraction, does not relay the packet to the next. For example, the "relay direction" possesses information such as "omnidirectional," "just behind," or "diagonal," and the relay follows the information.

The "control effective time" is a countermeasure to prevent the actuators from continuously being ON all times especially in a case where the control information is "ON" (even for any one of actuators) and an "OFF" packet has been failed to be received. The driving of the actuator can be OFF even when this state cannot be detected due to disturbance while a "not being received state" of the vibration waveform from the first wireless transmitting unit 103 is cooperated.

Figure 10:
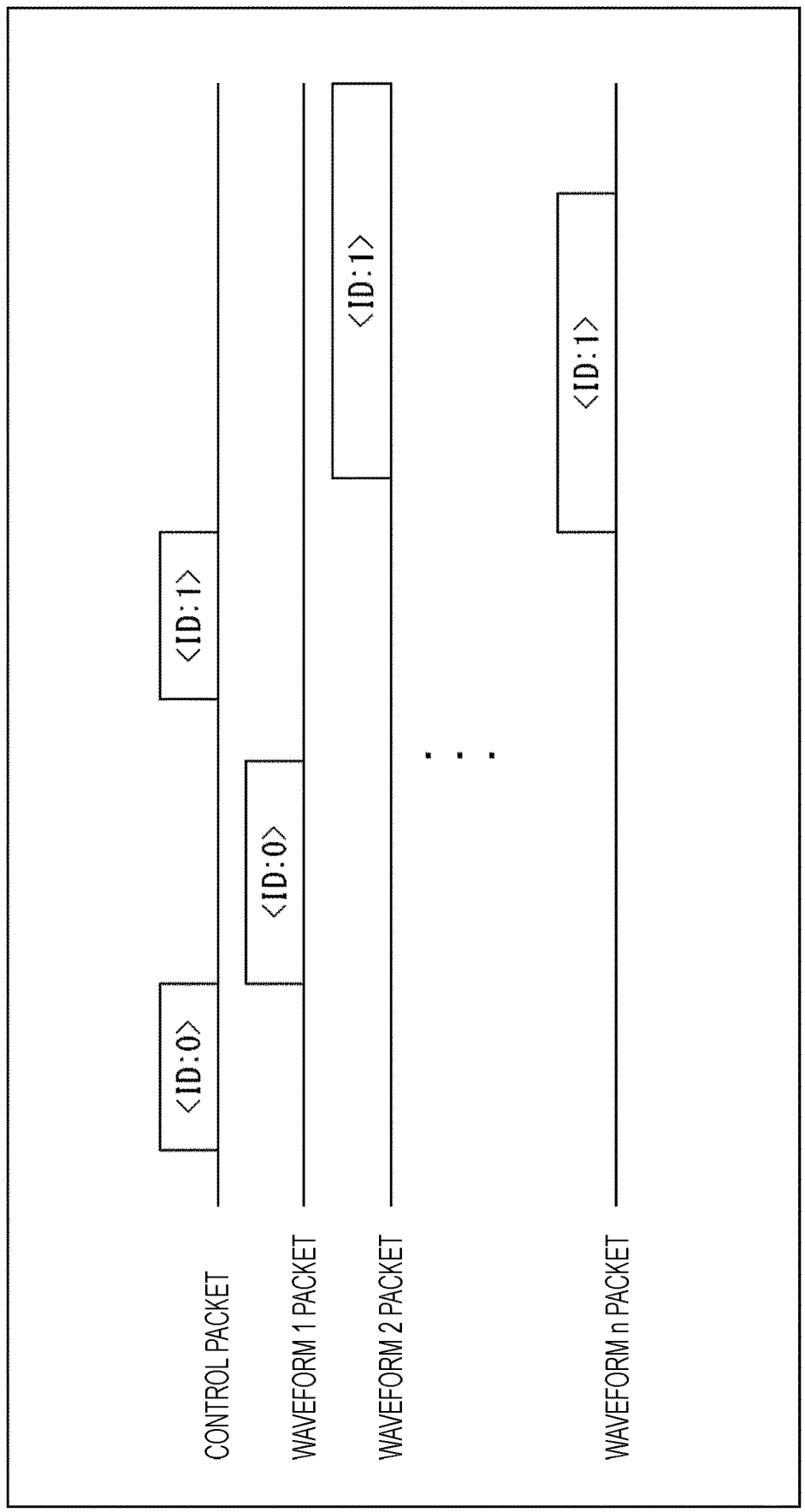
FIG. 10 is a diagram showing an example of a timing chart of the packet transmission.
Figure 11:
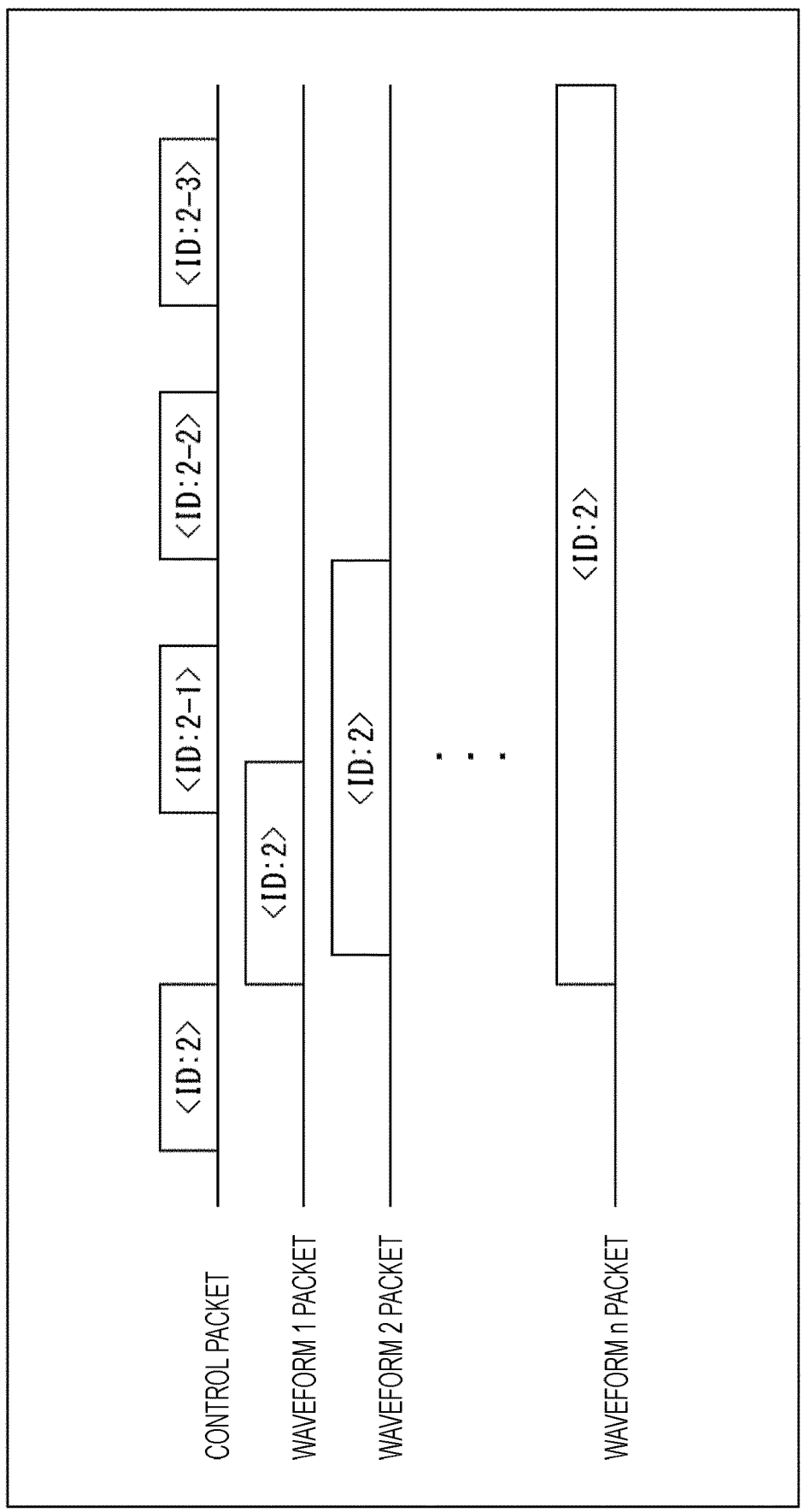
FIG. 11 is a diagram showing an example of a timing chart of the packet transmission.

FIGS. 10 and 11 are diagrams showing examples of timing charts of the packet transmission. Note that, in the examples in FIGS. 10 and 11, a control packet is the signal from the second wireless transmitting unit 105, and a waveform m packet (m≥0) is the signal from the first wireless transmitting unit 103.

In the example in FIG. 10, a waveform 1 packet of <ID: 0> starts to be transmitted immediately after a control packet of <ID: 0> is transmitted, a waveform n packet of <ID: 1> starts to be transmitted immediately after a control packet of <ID: 1> is transmitted, and a waveform 2 packet of <ID: 1> starts to be transmitted slightly later and before the transmission of the waveform n packet is completed.

In other words, <ID: 0> controls the vibration waveform of the waveform 1 packet. However, the control packet itself includes the control information of other actuators, but the control information is "OFF."

<ID: 1> controls the vibration waveforms of the waveform 2 packet and the waveform n packet. The timing at which the waveform m packet is transmitted does not necessarily have to be immediately after the control packet is transmitted.

In the example in FIG. 11, a waveform 1 packet and a waveform n packet of <ID: 2> start to be transmitted immediately after a control packet of <ID: 2> is transmitted, and a waveform 2 packet of <ID: 2> starts to be transmitted slightly later.

After the control packet of <ID: 2> is transmitted, a control packet of <ID: 2-1> is transmitted, a control packet of <ID: 2-2> is transmitted, and then a control packet of <ID: 2-3> is transmitted in order. The transmission of the waveform 1 packet is completed during the transmission of <ID: 2-1>, the transmission of the waveform 2 packet is completed just before the transmission of <ID: 2-2>, and the transmission of the waveform n packet is completed after the control packet of <ID: 2-3> is transmitted.

In other words, <ID: 2> controls the vibration waveforms of the waveform 1 packet, the waveform 2 packet and the waveform n packet. <ID: 2-*> controls the vibration waveform of the waveform n packet to be ON/OFF.

In the example in FIG. 11, unlike switching ON/OFF of the vibration waveform by the transmission of the waveform m packet, ON/OFF of the vibration waveforms can be easily performed at different timings by using a different control packet for a different area while the waveforms themselves are continuously transmitted for a long period of time.

Figure 12:
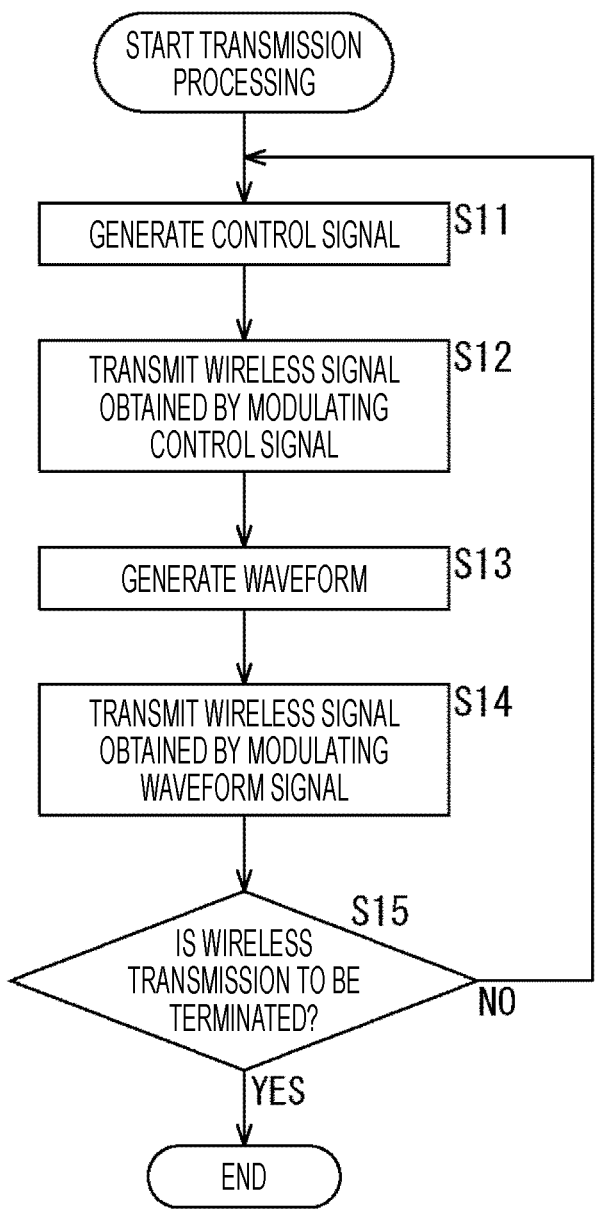
FIG. 12 is a flowchart illustrating the transmission processing of the transmitting apparatus.

Next, the transmission processing of the transmitting apparatus 11 will be described with reference to the flowchart in FIG. 12.

To vibrate the vibrating unit 31, the control unit 101 defines the vibration waveform and the control condition and issues an instruction to the waveform generating unit 102 and the control information generating unit 104.

In Step S11, on the basis of the control condition from the control unit 101, the control information generating unit 104 generates the control signal for the function control unit 115 to perform the control operation and outputs the control signal to the second wireless transmitting unit 105. In Step S12, the second wireless transmitting unit 105 modulates the control signal from the control information generating unit 104 to be outputted as a wireless signal. In other words, the second wireless transmitting unit 105 transmits the wireless signal obtained by modulating the control signal.

In Step S13, on the basis of the waveform information from the control unit 101, the waveform generating unit 102 generates the waveform signal for vibrating the vibrating unit 31 and outputs the waveform signal to the first wireless transmitting unit 103. In Step S14, the first wireless transmitting unit 103 modulates the waveform signal from the waveform generating unit 102 to be outputted as a wireless signal. In other words, the first wireless transmitting unit 103 transmits the wireless signal obtained by modulating the waveform signal.

In Step S15, the control unit 101 determines whether or not to terminate the wireless transmission. In a case where the wireless transmission is determined to be not terminated in Step S15, the processing returns to Step S11 and the subsequent processings are repeated.

On the other hand, in a case where the wireless transmission is determined to be terminated in Step S15, the transmission processing is terminated.

Next, the reception processing of the wearable receiving apparatus 12 will be described with reference to the flowchart in FIG. 13.

In Step S51, the first wireless receiving unit 111 performs incoming/header analysis of the wireless signal. In other words, the first wireless receiving unit 111 receives an incoming wireless signal, performs a wireless demodulation processing and generates the waveform signal as well as analyzes the header accompanying the waveform signal, obtains the condition and the information and outputs the waveform signal, the condition and the information to the vibration waveform generating unit 112.

In Step 352, the vibration waveform generating unit 112 refers to the header of the waveform signal (FIG. 8) and determines whether or not there is place restriction. In a case where it is determined in Step S52 that there is place restriction, the processing proceeds to Step S53 in order to utilize the instruction from the function control unit 115. In a case where it is determined in Step S52 that there is no place restriction, the waveform signal is regarded as the waveform signal directly outputted to the vibrating unit 31, and the processing skips Steps S53 and S54 and proceeds to Step S55.

In Step S53, the vibration waveform generating unit 112 determines whether or not there is a received signal at the second wireless receiving unit 114 in the function control unit 115. In a case where the received signal from the second wireless receiving unit 114 is obtained in the function control unit 115, it is determined in Step S53 that there is reception at the second wireless receiving unit 114, and the processing proceeds to Step S54. In a case where the received signal from the second wireless receiving unit 114 is not obtained in the function control unit 115, it is determined in Step S53 that there is no reception at the second wireless receiving unit 114, and the processing skips Steps S54 and S55 and proceeds to Step S56. In other words, in this case, the user 13 is not in the beam irradiation area 41, and the vibrating unit 31 does not vibrate.

In Step S54, the vibration waveform generating unit 112 determines whether or not the function control and the vibration are ON, in other words, whether or not the function control unit 115 vibrates the vibrating unit 31. Branching is performed as to whether the function control unit 115 controls the operation of the vibration waveform generating unit 112 on the basis of the instruction obtained via the first wireless receiving unit 111 so that the vibration waveform generating unit 112 generates the vibration waveform to vibrate the vibrating unit 31, or a vibration waveform is not generated so that the vibrating unit 31 is not vibrated. In the case of vibrating, it is determined in Step S54 that the function control and the vibration are ON, and the processing proceeds to Step S55. In the case of not vibrating, it is determined in Step S54 that the function control and the vibration are not ON, and the processing skips Step S55 and proceeds to Step S56. In other words, in this case, even if the user 13 is in the beam irradiation area 41, the operation is not uniformly performed, but a processing such as generation timing control for vibration waveform from the function control unit 115 is also performed.

In Step S55, the vibration waveform generating unit 112 vibrates the vibrating unit 31. In other words, the vibrating unit 31 generates the vibration. In Step S56, the first wireless receiving unit 111 determines whether or not the reception of the wireless signal via the first wireless receiving unit 111 is still continuing or terminating. In a case where it is determined in Step S56 that the reception is still continuing, the processing returns to Step S51, and the subsequent processings are repeated.

Figure 13:
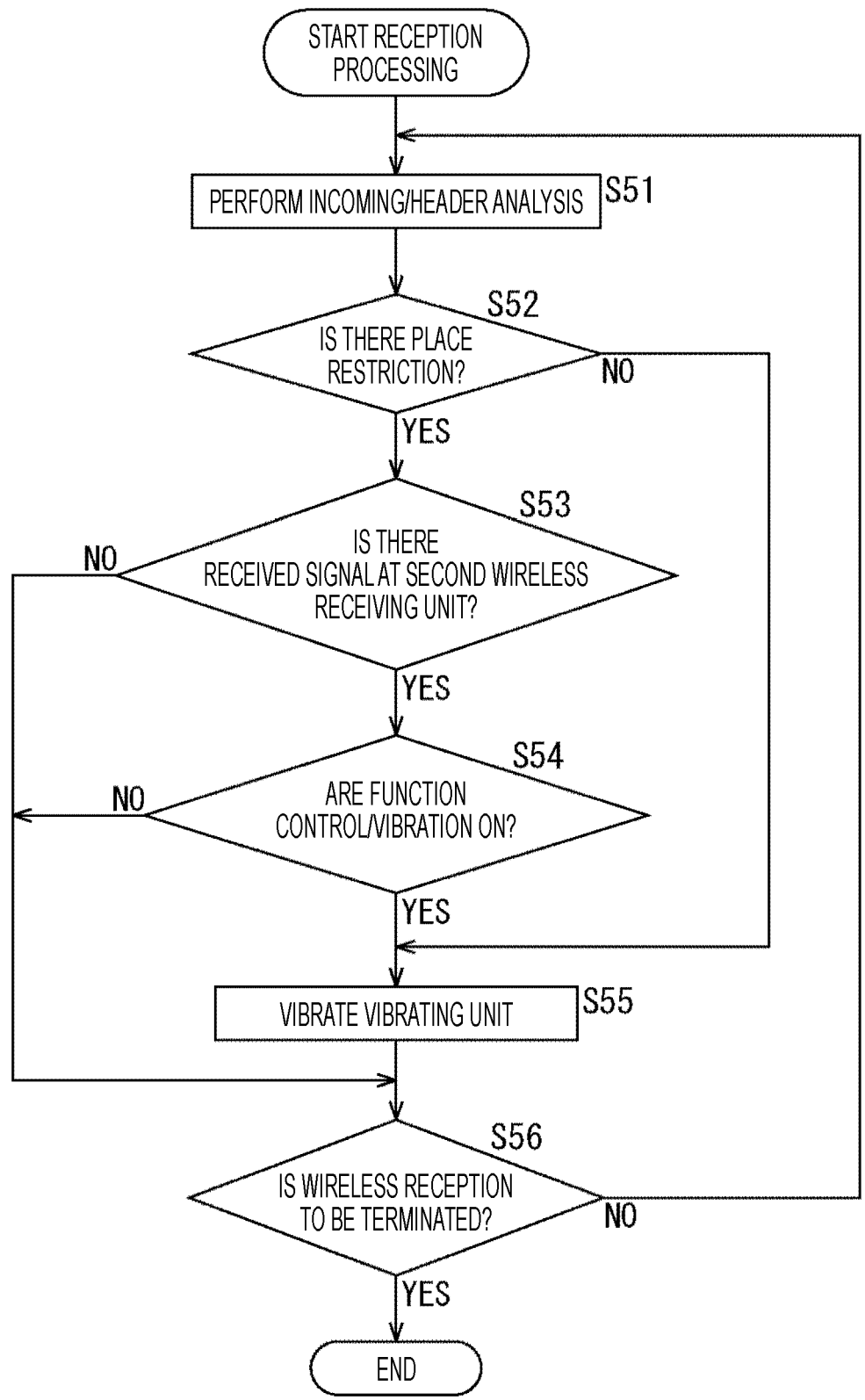
FIG. 13 is a flowchart illustrating the reception processing of the wearable receiving apparatus.

In a case where it is determined in Step S56 that the reception is to be terminated, the reception processing in FIG. 13 is terminated.

Figure 14:
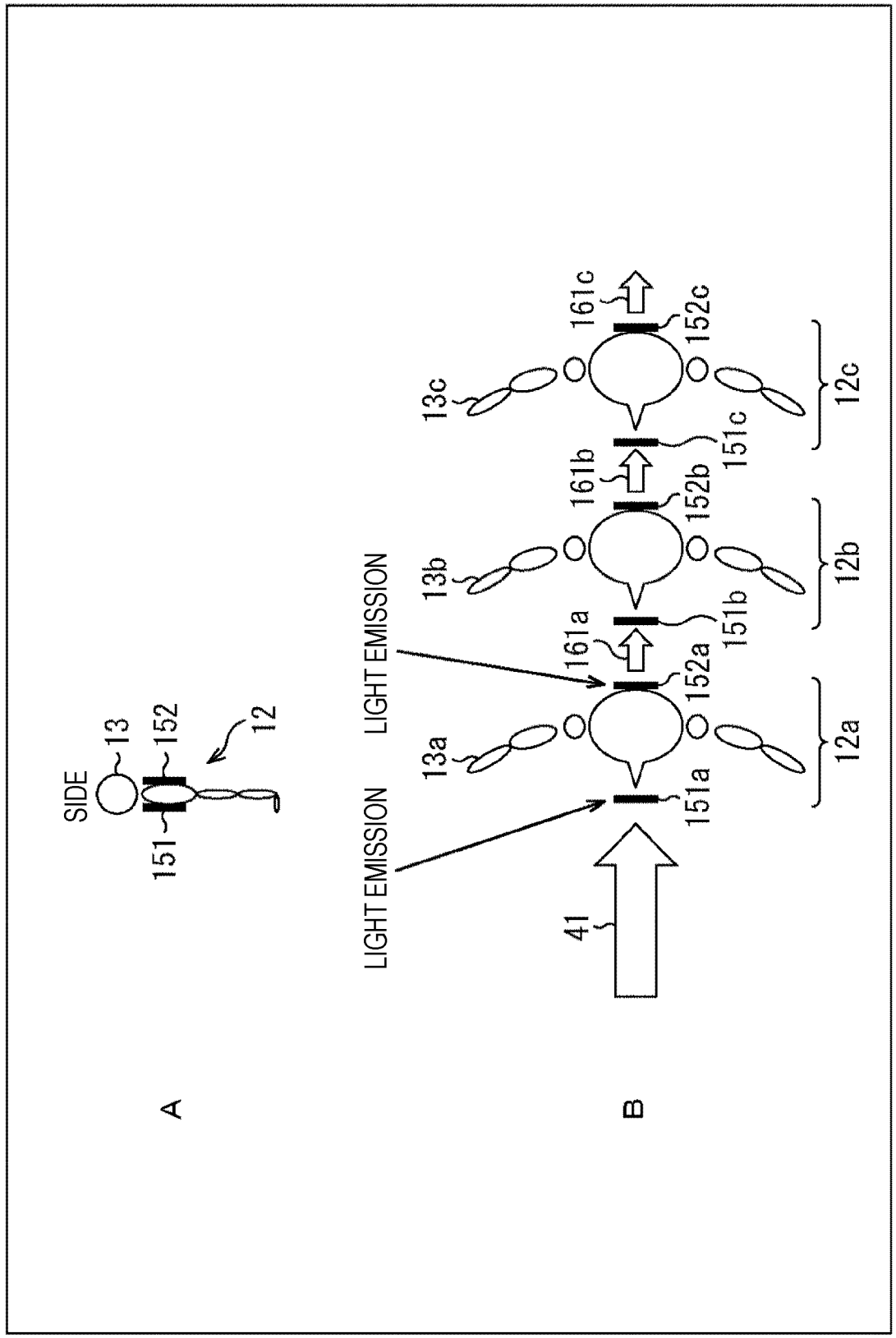
FIG. 14 is a diagram showing another configuration example of the wearable receiving apparatus.

FIG. 14 is a diagram showing another configuration example of the wearable receiving apparatus. The example of A in FIG. 14 shows an example in which the user 13 wearing the wearable receiving apparatus 12 is viewed from the side. The example of B in FIG. 14 shows an example in which the beam irradiation areas 41 and 161a to 161c whose beam traveling directions are indicated by arrows, the user 13a wearing the wearable receiving apparatus 12a, the user 13b wearing the wearable receiving apparatus 12b, and the user 13c wearing the wearable receiving apparatus 12c are viewed from the top. Note that the beam irradiation area 41 is a beam irradiation area of the transmission from the directional transmitting device unit 22, and the beam irradiation areas 161a to 161c are beam irradiation areas of the signals transmitted from third wireless transmitting units 152a to 152c alternately serving the beam irradiation areas, respectively.

As shown in A of FIG. 14, the wearable receiving apparatus 12 is configured by including a second wireless receiving unit 151 worn on the front of the user 13 and a third wireless transmitting unit 152 worn on the back of the user 13.

As shown in B of FIG. 14, a second wireless receiving unit 151a receives the signal transmitted from the directional transmitting device unit 22. Second wireless receiving units 151b and 151c receive the signals transmitted from the third wireless transmitting units 152a and 152b, respectively. The third wireless transmitting units 152a to 152c successively transmit signals similar to the signals received by the second wireless receiving units 151a to 151c and the like, respectively. The signals transmitted from the third wireless transmitting units 152a to 152c spread to the beam irradiation areas 161a to 161c on the extended line of the beam irradiation area 41.

The wearable receiving apparatus 12 having the aforementioned configuration in FIG. 6 shows the state in the case where the signal transmitted from the directional transmitting device unit 22 uses light. For example, when the beam irradiation area 41 is irradiated at the front of the user 13, the beam irradiation area 41 is interrupted behind the user 13.

On the other hand, in the wearable receiving apparatus 12 having the configuration in FIG. 14, the third wireless transmitting unit 152a transmits the signal received by the second wireless receiving unit 151a so that the information regarding the signal transmitted from the directional transmitting device unit 22 is conveyed to the second wireless receiving unit 151b. Similarly, the third wireless transmitting unit 152b transmits the signal received by the second wireless receiving unit 151b so that the information regarding the signal transmitted from the directional transmitting device unit 22 is conveyed to the second wireless receiving unit 151c.

As described above, even if there is a beam irradiation area 41 interrupted by the user 13, information can be transmitted to other users behind that user 13.

Note that the second wireless receiving unit 151 and the third wireless transmitting unit 152 may be each single or plural. For example, the second wireless receiving unit 151 and the third wireless transmitting unit 152 may be installed symmetrically to the center of the body (line of backbone). Strictly speaking, the transmitting/receiving device units leading to the respective wireless transmitting/receiving units are installed at symmetrical positions.

Next, the functions of the second wireless receiving unit 151 and the third wireless transmitting unit 152 will be described with reference to FIG. 15.

Figure 15:
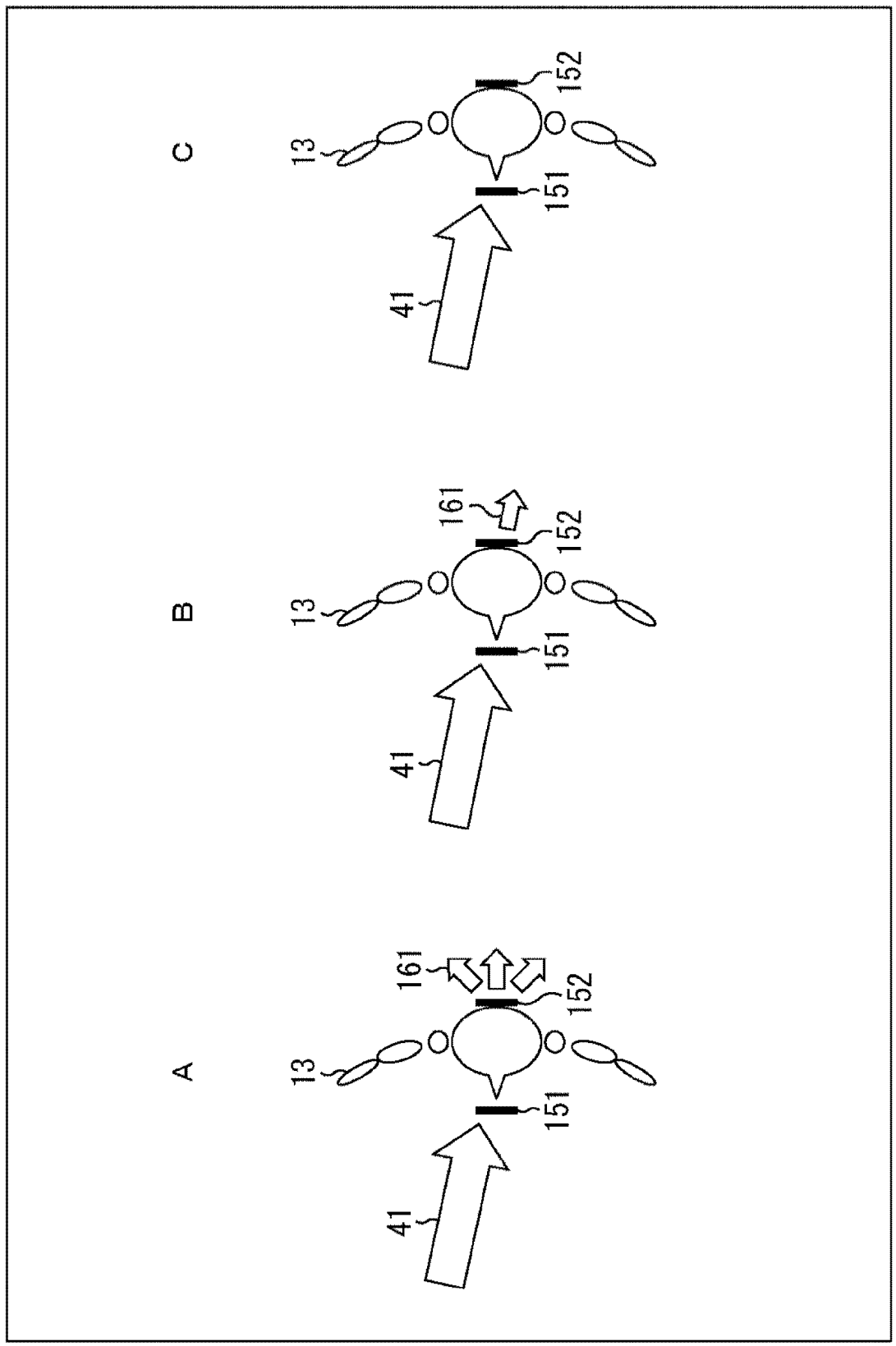
FIG. 15 is a diagram illustrating the functions of the second wireless receiving unit and the third wireless transmitting unit.

In the example in A of FIG. 15, the third wireless transmitting unit 152 omnidirectionally transmits the signal received by the second wireless receiving unit 151. In other words, regardless of the direction of the light received by the second wireless receiving unit 151, the third wireless transmitting unit 152 emits light by a wide angle to the next (the face on the opposite side of the body) as shown by the beam irradiation area 161.

In the example in B of FIG. 15, in the direction penetrating the user 13, the third wireless transmitting unit 152 emits the light, with directivity, of the signal received by the second wireless receiving unit 151 as shown by the beam irradiation area 161 in consideration of the direction of the reception by the second wireless receiving unit 151.

In the example in C of FIG. 15, even if the signal is received by the second wireless receiving unit 151, the third wireless transmitting unit 152 does not transmit the received signal.

Note that the functions are not limited to these three types. In addition, which function for the operation is determined in the wearable receiving apparatus 12 by a separately defined method. Examples of the separately defined method include a method in which information is indicated on a broadcasted signal, a method in which information is indicated on a signal received by the second wireless receiving unit 151, a method set in the wearable receiving apparatus 12 at the time of activating the system, and the like.

Figure 16:
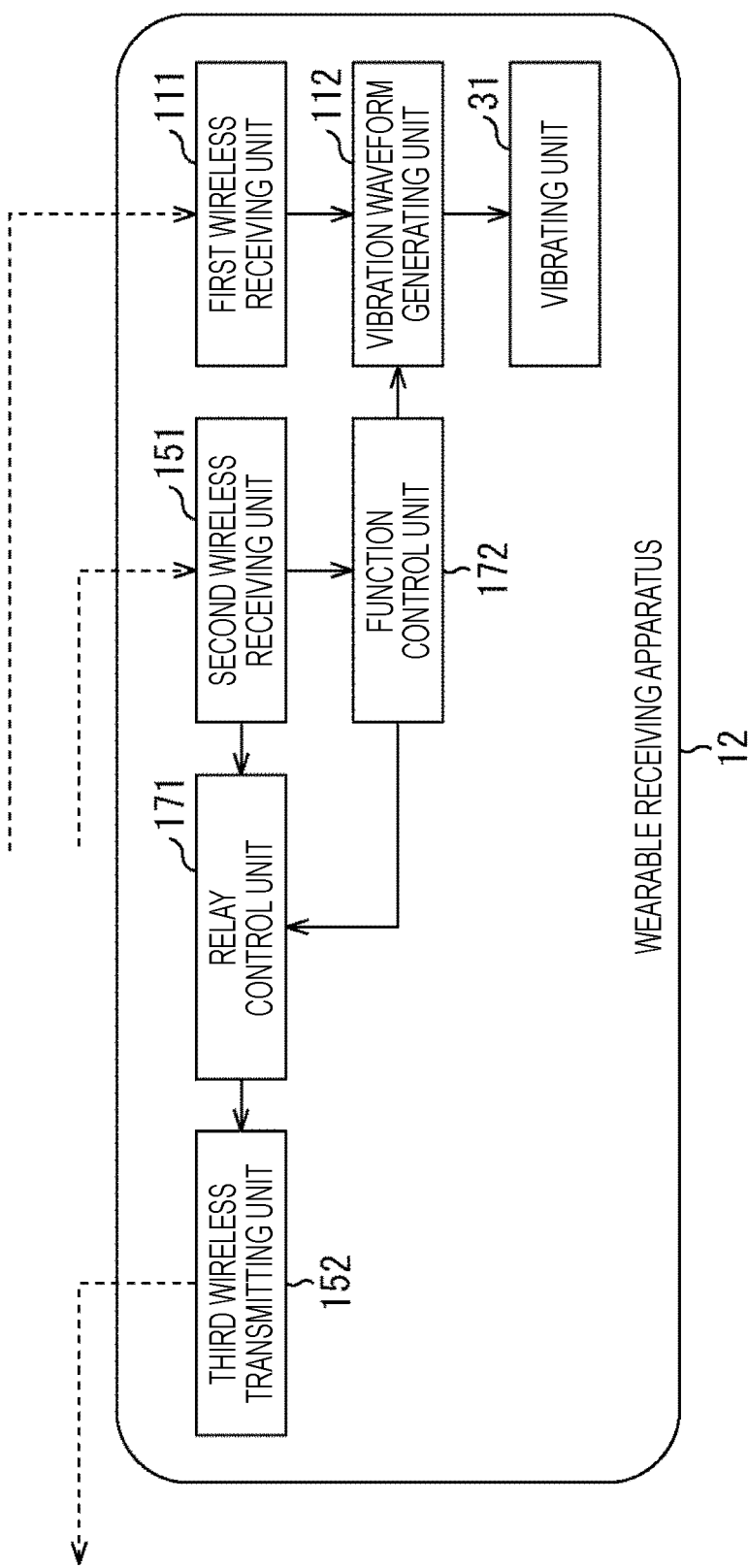
FIG. 16 is a block diagram showing another configuration example of the wearable receiving apparatus.

FIG. 16 is a block diagram showing another configuration example of the wearable receiving apparatus 12.

The wearable receiving apparatus 12 in FIG. 16 includes the first wireless receiving unit 111, the vibration waveform generating unit 112 and the vibrating unit 31 in common with the wearable receiving apparatus 12 in FIG. 7.

The wearable receiving apparatus 12 in FIG. 16 is different from the wearable receiving apparatus 12 in FIG. 7 in that the second wireless receiving unit 114 is replaced with the second wireless receiving unit 151 in FIG. 14, the function control unit 115 is replaced with a function control unit 172, and the third wireless transmitting unit 152 in FIG. 14 and a relay control unit 171 are added.

In other words, the function control unit 172 outputs the control condition not only to the vibration waveform generating unit 112 but also to the relay control unit 171. The relay control unit 171 outputs the control signal from the second wireless receiving unit 151 to the third wireless transmitting unit 152 on the basis of the control condition from the function control unit 172. The third wireless transmitting unit 152 modulates the control signal from the relay control unit 171 to be outputted as a wireless signal.

The relay control unit 171 selects the aforementioned three functions with reference to A of FIG. 15 to C of FIG. 15. Note that, although not shown, a large number of third wireless transmitting units 152 are provided, and which third wireless transmitting unit 152 to which the control signal is outputted is decided by the operation of the relay control unit 171.

Note that the second wireless receiving unit 151 and the third wireless transmitting unit 152, which are the functions of relaying to the vibrating unit 31, aim to relay in the beam irradiation area. The environmental changes due to the movement of an individual should be operated by an independent function of a relay device here, and a special function that prevents the interruption of the relay is not necessary.

Moreover, the control packet itself is a packet as short as the assumed number [ms], and unlike the length of the number [s] considered for the vibration waveform packet, reception/transmission of the control packet itself is instantaneous even when the body is moving, and the environmental changes (directions of bodies) should not be taken into consideration.

If a countermeasure is to be taken in light of the above against a case where the light is received while the body is moving, for example, it is preferred that the twist of the body be detected by using a gyrosensor, the reception of the wireless signal originally to the device diagonal to the reception extending direction be assigned to a different device in accordance with the rotation amount, the function of obtaining the angle by calculation and adjusting the relay direction be possessed by the relay control unit 171 in FIG. 16 in a case where the relay direction is just behind, and a signal be outputted to an appropriate third wireless transmitting unit 152.

Figure 17:
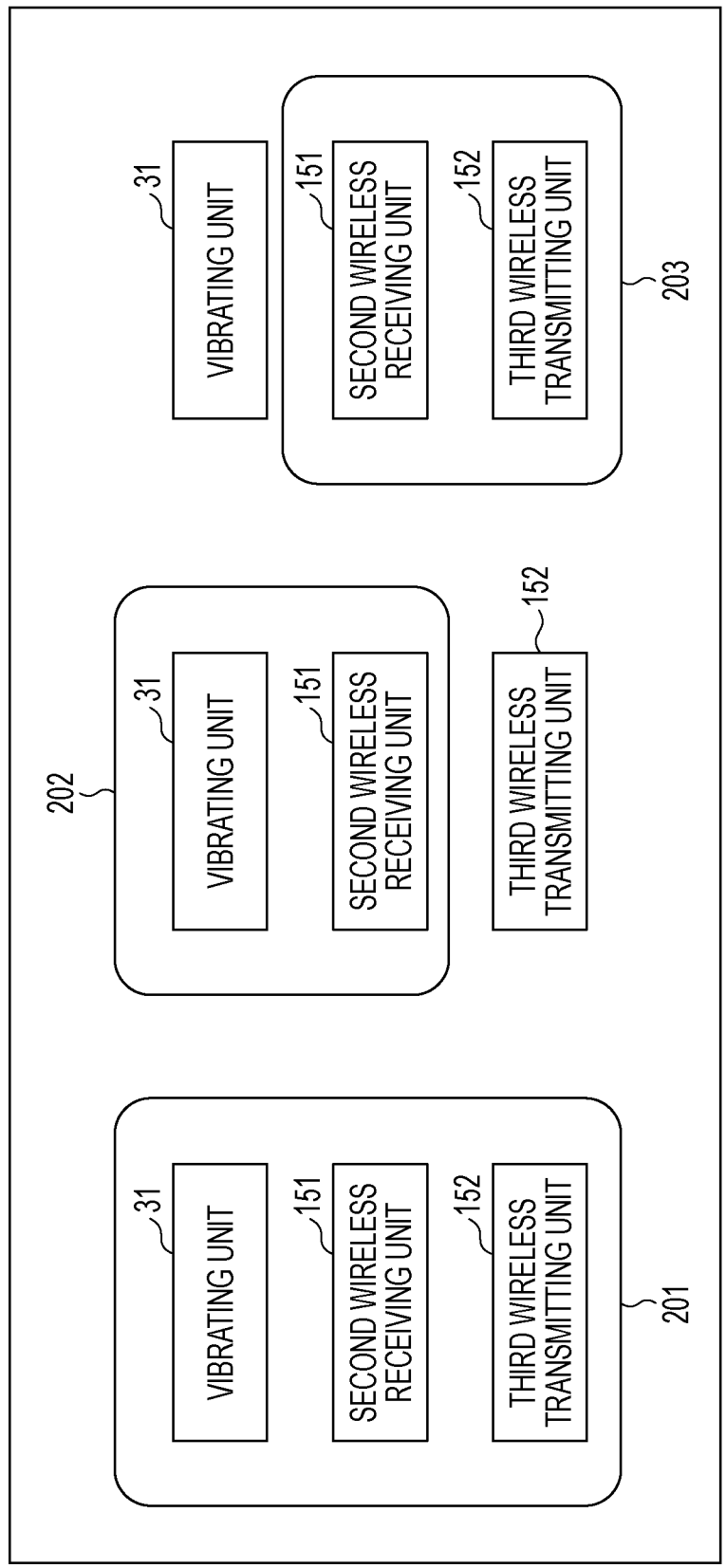
FIG. 17 is a diagram showing examples of the combined configuration of the vibrating unit, the second wireless receiving unit and the third wireless transmitting unit.

FIG. 17 is a diagram showing examples of the combined configuration of the vibrating unit, the second wireless receiving unit and the third wireless transmitting unit.

In a three-block integrated type 201, the vibrating unit 31, the second wireless receiving unit 151 and the third wireless transmitting unit 152 are integrated. In a two-block integrated type 202, the vibrating unit 31 and the second wireless receiving unit 151 are integrated. In a two-block integrated type 203, the second wireless receiving unit 151 and the third wireless transmitting unit 152 are integrated.

The case of the three-block integrated type 201 is a case with the premise that the reception direction and the vibration direction are matched, and the relay output direction is the reception extending direction.

The case of two-block integrated type 202 is a case where the reception direction and the vibration direction are matched, but the relay output direction can be set independently of the other two-block integrated type 202, and the third wireless transmitting unit 152 can be installed at position optimized for the relay direction without depending on the installation position of the vibrating unit 31.

In the case of the two-block integrated type 203, since the second wireless receiving unit 151 and the third wireless transmitting unit 152, which are the functions of relaying to the vibrating unit 31, are independent of each other, the received signal is ON/OFF information of each actuator (vibrating unit 31) included in the control information previously described with reference to FIG. 9. In other words, this is a case where there is no premise that the reception direction and the vibration direction are matched, but an actuator managed by the transmitting apparatus 11 is driven regardless of the direction of the body of each user 13.

Note that, in the packet format example in FIG. 9, the control information should possess information regarding only the corresponding actuator for the three-block integrated type 201 and the two-block integrated type 202.

As an example, a plurality of three-block integrated types 201 are installed in the wearable receiving apparatus 12, the vibrating units 31 at the positions where the control signals could have been received vibrate from the relationship between the vibrating units 31 and the second wireless receiving units 151, and the third wireless transmitting units 152 positioned symmetrically to the center of body in FIG. 14 are wired so as to transmit the signals to the positions where the control signals could have been received from the relationship between the second wireless receiving units 151 and the third wireless transmitting units 152.

In other words, although not shown, in a case where one set of a vibrating unit 31a, the second wireless receiving unit 151a and the third wireless transmitting unit 152a and one set of a vibrating unit 31b, the second wireless receiving unit 151b and the third wireless receiving unit 152b are installed in the wearable receiving apparatus 12, the vibrating unit 31a, the second wireless receiving unit 151a and the third wireless transmitting unit 152b are integrated in the three-block integrated type 201a, and the vibrating unit 31b, the second wireless receiving unit 151b and the third wireless transmitting unit 152a are integrated in the three-block integrated type 201b. In addition, a function control unit 172a and a function control unit 172b may operate in cooperation. Since the functions of the two-block integrated type 202 and the two-block integrated type 203 correspond to a part of the functions of the three-block integrated type 201, the explanation thereof is omitted.

Note that a communication system with desired directivity by IR signals, ultrasonic signals, or the like is preferably utilized for the communication system between the second wireless transmitting unit 105 and the second wireless receiving unit 114 and the communication system between the third wireless transmitting unit 152 and the second wireless receiving unit 114.

Moreover, in the above communication system, the power received by the second wireless receiving unit 114 (the second wireless receiving unit 151) may be associated with the intensity of the vibration waveform generated by the vibration waveform generating unit 112. Along with this, the power outputted by the third wireless transmitting unit 152 may also be associated with the power received by the second wireless receiving unit 151.

As described above, according to the present technology, it is possible to vibrate only a device in the specific area of the receiving area. In other words, according to the present technology, it is possible to make presentation in the restricted area where tactile (vibration) presentation is performed in a system capable of making tactile (vibration) presentation to numerous receivers.

<Personal Computer>

The series of processings described above can be executed by hardware or can be executed by software. In a case where the series of processings are executed by the software, a program configuring that software is installed in a computer. Here, the computer includes a computer incorporated into dedicated hardware, a general-purpose personal computer capable of executing various functions by being installed with various programs, and the like.

Figure 18:
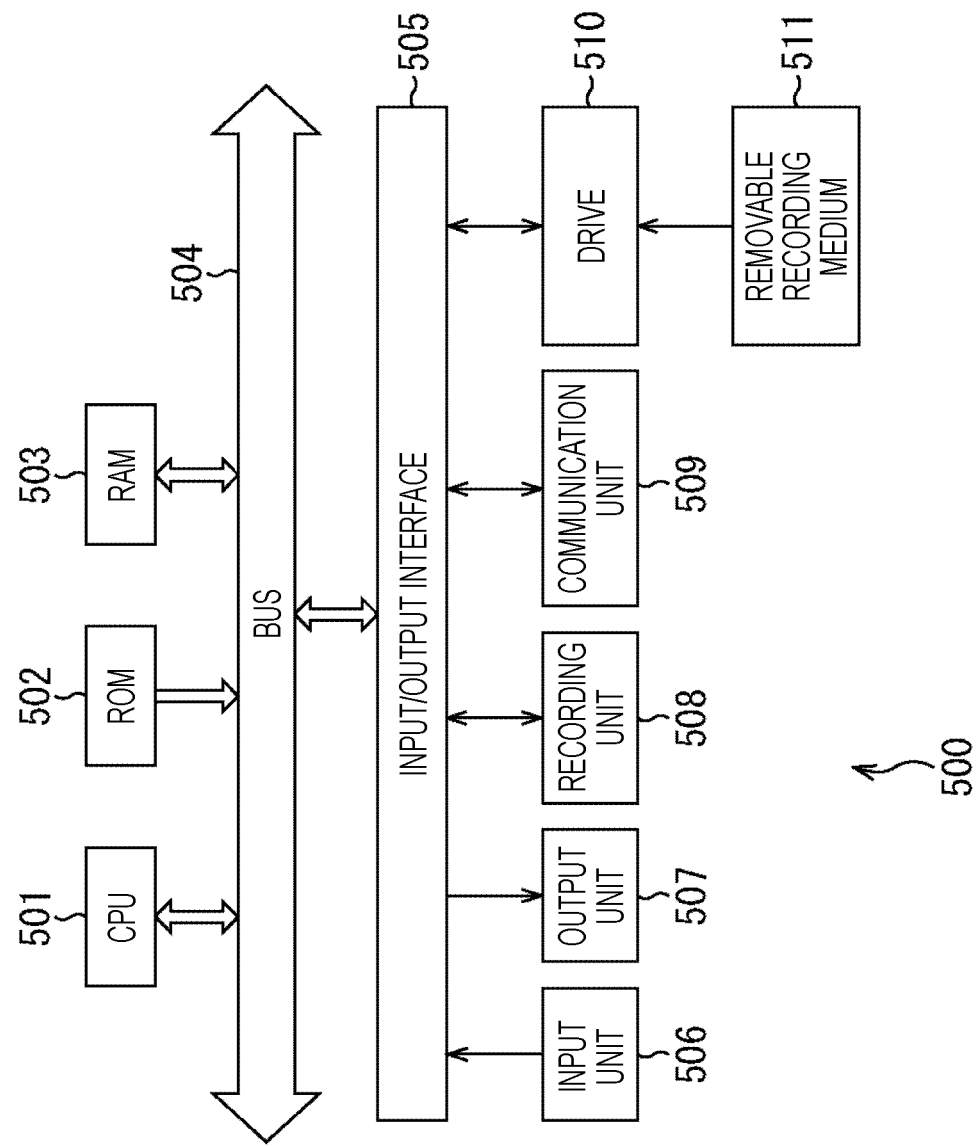
FIG. 18 is a block diagram showing an example of a personal computer.

FIG. 18 is a block diagram showing a configuration example of hardware of a personal computer which executes the aforementioned series of processings by a program.

In a personal computer 500, a central processing unit (CPU) 501, a read only memory (ROM) 502 and a random access memory (RAM) 503 are connected to each other by a bus 504.

The bus 504 is further connected to an input/output interface 505. To the input/output interface 505, an input unit 506, an output unit 507, a storage unit 508, a communication unit 509 and a drive 510 are connected.

The input unit 506 includes a keyboard, a mouse, a microphone and the like. The output unit 507 includes a display, a speaker and the like. The storage unit 508 includes a hard disk, a nonvolatile memory and the like. The communication unit 509 includes a network interface and the like. The drive 510 drives a removable medium 511 such as a magnetic disk, an optical disk, a magneto-optical disk, or a semiconductor memory.

In the personal computer 500 configured as described above, the CPU 501 loads, for example, a program stored in the storage unit 508 into the RAM 503 via the input/output interface 505 and the bus 504 and executes the program. Accordingly, the aforementioned series of processings are performed.

The program executed by the computer (CPU 501) can be recorded on the removable medium 511 to be provided. The removable medium 511 is, for example, a package medium or the like including a magnetic disk (including a flexible disk), an optical disk (compact disc-read only memory (CD-ROM), a digital versatile disc (DVD) or the like), a magneto-optical disk, a semiconductor memory or the like. Alternatively, the program can be provided via a wired or wireless transmission medium such as a local area network, the Internet, or digital satellite broadcasting.

In the computer, the program can be installed in the storage unit 508 via the input/output interface 505 by attaching the removable medium 511 to the drive 510. Moreover, the program can be received by the communication unit 509 via the wired or wireless transmission medium and installed in the storage unit 508. In addition, the program can be installed in the ROM 502 or the storage unit 508 in advance.

Note that the program executed by the computer may be a program in which the processings are performed in time series according to the order described in this specification, or may be a program in which the processings are performed in parallel or at necessary stages such as when a call is made.

Furthermore, in this specification, the steps describing the program recorded on a recording medium include not only the processings performed in a time series according to the described order, but also processings executed in parallel or individually, not necessarily processed in time series.

Further, in this specification, the system represents the entire apparatus constituted by a plurality of devices (apparatuses).

For example, the present disclosure can adopt the configuration of cloud computing in which one function is shared and collaboratively processed by a plurality of apparatuses via a network.

Moreover, the configuration described above as one apparatus (or processing unit) may be divided and configured as a plurality of apparatuses (or processing units). On the contrary, the configuration described above as a plurality of apparatuses (or processing units) may be collectively configured as one apparatus (or processing unit). Furthermore, it is needless to say that constituents other than those described above can be added to the configuration of each apparatus (or each processing unit). Further, as long as the configuration and operation of the entire system are substantially the same, a part of the configuration of a certain apparatus (or processing unit) may be included in the configuration of other apparatuses (or other processing units). That is, the present technology is not limited to the above embodiments, and various changes can be made in a scope without departing from the gist of the present technology.

Although the preferred embodiments of the present disclosure have been described in detail with reference to the accompanying drawings, the present disclosure is not limited to these examples. It is obvious that a person ordinarily skilled in the art of the present disclosure can arrive at various changing examples or modification examples within the scope of the technical idea described in the claims, and it is to be understood that these are also within the technical scope of the present disclosure as a matter of course.

Note that the present technology can also adopt the following configurations.

(1) A receiving apparatus including:

a first wireless receiving unit that receives a first wireless signal including a waveform of vibration;

a second wireless receiving unit that receives a second wireless signal in a predetermined area, the second wireless signal including control information for controlling ON/OFF of the vibration;

a waveform generating unit that generates, on the basis of the control information included in the second wireless signal received by the second wireless receiving unit, the waveform of the vibration from the first wireless signal received by the first wireless receiving unit; and a vibrating unit that produces the vibration according to the waveform generated by the waveform generating unit.

(2) The receiving apparatus according to (1), in which the first wireless receiving unit receives the first wireless signal by broadcasting.

(3) The receiving apparatus according to (1) or (2), in which the second wireless receiving unit receives the second wireless signal by using an IR signal.

(4) The receiving apparatus according to (1) or (2), in which the second wireless receiving unit receives the second wireless signal by using an ultrasonic signal.

(5) The receiving apparatus according to any one of (1) to (4), in which the first wireless signal has information indicating presence or absence of place restriction for generating the waveform of the vibration, the waveform generating unit generates, on the basis of the control information included in the second wireless signal received by the second wireless receiving unit, the waveform of the vibration from the first wireless signal received by the first wireless receiving unit in a case where the presence of the place restriction is indicated in the first wireless signal, and the waveform generating unit generates the waveform of the vibration from the first wireless signal received by the first wireless receiving unit in a case where the absence of the place restriction is indicated in the first wireless signal.

(6) The receiving apparatus according to any one of (1) to (5), further including:

a relay control unit that controls relay of the second wireless signal received by the second wireless receiving unit; and a wireless transmitting unit that transmits, to an outside, the second wireless signal whose relay is controlled by the relay control unit.

(7) The receiving apparatus according to any one of (1) to (6), in which the receiving apparatus is formed to be wearable and worn on a user.

(8) The receiving apparatus according to any one of (1) to (7), in which the predetermined area is spread in a direction same as a projection direction in which a video is projected by a projector.

(9) A receiving method including:

receiving, by a receiving apparatus, a first wireless signal including a waveform of vibration;

receiving, by the receiving apparatus, a second wireless signal including control information for controlling ON/OFF of the vibration, in a predetermined area;

generating, by the receiving apparatus, on the basis of the control information included in the second wireless signal received, the waveform of the vibration from the first wireless signal received; and producing, by the receiving apparatus, the vibration according to the waveform generated.

(10) A program causing a computer to function as:

a first wireless receiving unit that receives a first wireless signal including a waveform of vibration;

a second wireless receiving unit that receives a second wireless signal in a predetermined area, the second wireless signal including control information for controlling ON/OFF of the vibration;

a waveform generating unit that generates, on the basis of the control information included in the second wireless signal received by the second wireless receiving unit, the waveform of the vibration from the first wireless signal received by the first wireless receiving unit; and a vibrating unit that produces the vibration according to the waveform generated by the waveform generating unit.

(11) A transmitting apparatus including:

a waveform generating unit that generates a waveform of vibration for vibrating a receiving apparatus;

a first wireless transmitting unit that modulates the waveform generated by the waveform generating unit and transmits the modulated waveform as a first wireless signal;

a control information generating unit that generates control information for controlling ON/OFF of the vibration; and a second wireless transmitting unit that modulates the control information generated by the control information generating unit and transmits, to a predetermined area, the modulated control information as a second wireless signal.

(12) The transmitting apparatus according to (11), in which the first wireless transmitting unit transmits the first wireless signal by broadcasting.

(13) The transmitting apparatus according to (11) or (12), in which the second wireless transmitting unit transmits the second wireless signal by using an IR signal.

(14) The transmitting apparatus according to (11) or (12), in which the second wireless transmitting unit transmits the second wireless signal by using an ultrasonic signal.

(15) The transmitting apparatus according to any one of (11) to (14), in which the first wireless signal includes information indicating presence or absence of place restriction for generating the waveform of the vibration, which is controlled by the control information.

(16) The transmitting apparatus according to any one of (11) to (15), in which the receiving apparatus is formed to be wearable and worn on a user.

(17) The transmitting apparatus according to any one of (11) to (16), further including a projector that projects a video in a projection area spread in a same direction as the predetermined area.

(18) A transmitting method including:

generating, by a transmitting apparatus, a waveform of vibration for vibrating a receiving apparatus;

modulating, by the transmitting apparatus, the waveform generated and transmitting the modulated waveform as a first wireless signal;

generating, by the transmitting apparatus, control information for controlling ON/OFF of the vibration; and modulating, by the transmitting apparatus, the control information generated and transmitting, to a predetermined area, the modulated control information as a second wireless signal.

(19) A program causing a computer to function as:

a waveform generating unit that generates a waveform of vibration for vibrating a receiving apparatus;

a first wireless transmitting unit that modulates the waveform generated by the waveform generating unit and transmits the modulated waveform as a first wireless signal;

a control information generating unit that generates control information for controlling ON/OFF of the vibration; and a second wireless transmitting unit that modulates the control information generated by the control information generating unit and transmits, to a predetermined area, the modulated control information as a second wireless signal.

REFERENCE SIGNS LIST

1 Video projection system
11 Transmitting apparatus
12a to 12o, 12 Wearable receiving apparatus 13a to 13o, 13 User
14 Receiving area
21 Omnidirectional transmitting device unit
22 Directional transmitting device unit
22a Projector
31, 31-1 to 31-4 Vibrating unit
41 Beam irradiation area
42 Projection area
51 First wireless transmitting device unit
52 Second wireless transmitting device unit
61a to 61h, 61 First wireless receiving device unit
62a to 62h, 62 Second wireless receiving device unit
101 Control unit
102 Waveform generating unit
103 First wireless transmitting unit
104 Control information generating unit
105 Second wireless transmitting unit
111 First wireless receiving unit
112 Vibration waveform generating unit
114 Second wireless receiving unit
115 Function control unit
151, 151a to 151c Second wireless receiving unit
152, 152a to 152c Third wireless transmitting unit
161, 161a to 161c Beam irradiation area
171 Relay control unit
172, 172a Function control unit
201, 201a, 201b Three-block integrated type
202 Two-block integrated type
203 Two-block integrated type

The invention claimed is:

1. A receiving apparatus comprising:
a first wireless receiving unit that receives a first wireless signal including a waveform of vibration;
a second wireless receiving unit that receives a second wireless signal in a predetermined area, the second wireless signal including control information for controlling ON/OFF of the vibration;
a waveform generating unit that generates, on the basis of the control information included in the second wireless signal received by the second wireless receiving unit, the waveform of the vibration from the first wireless signal received by the first wireless receiving unit; and
a vibrating unit that produces the vibration according to the waveform generated by the waveform generating unit,
wherein the first wireless receiving unit, the second wireless receiving unit, the waveform generating unit, and the vibrating unit are each implemented via at least one processor.

2. The receiving apparatus according to claim 1, wherein the first wireless receiving unit receives the first wireless signal by broadcasting.

3. The receiving apparatus according to claim 1, wherein the second wireless receiving unit receives the second wireless signal by using an IR signal.

4. The receiving apparatus according to claim 1, wherein the second wireless receiving unit receives the second wireless signal by using an ultrasonic signal.

5. The receiving apparatus according to claim 1, wherein the first wireless signal has information indicating presence or absence of place restriction for generating the waveform of the vibration,
the waveform generating unit generates, on the basis of the control information included in the second wireless signal received by the second wireless receiving unit, the waveform of the vibration from the first wireless signal received by the first wireless receiving unit in a case where the presence of the place restriction is indicated in the first wireless signal, and
the waveform generating unit generates the waveform of the vibration from the first wireless signal received by the first wireless receiving unit in a case where the absence of the place restriction is indicated in the first wireless signal.

6. The receiving apparatus according to claim 1, further comprising:
a relay control unit that controls relay of the second wireless signal received by the second wireless receiving unit; and
a wireless transmitting unit that transmits, to an outside, the second wireless signal whose relay is controlled by the relay control unit,
wherein the relay control unit and the wireless transmitting unit are each implemented via at least one processor.

7. The receiving apparatus according to claim 1, wherein the receiving apparatus is formed to be wearable and worn on a user.

8. The receiving apparatus according to claim 1, wherein the predetermined area is spread in a direction same as a projection direction in which a video is projected by a projector.

9. A receiving method comprising:
receiving, by a receiving apparatus, a first wireless signal including a waveform of vibration;
receiving, by the receiving apparatus, a second wireless signal including control information for controlling ON/OFF of the vibration, in a predetermined area;
generating, by the receiving apparatus, on the basis of the control information included in the second wireless signal received, the waveform of the vibration from the first wireless signal received; and
producing, by the receiving apparatus, the vibration according to the waveform generated.

10. A non-transitory computer-readable medium having embodied thereon a program, which when executed by a computer causes the computer to execute a method, the method comprising:
receiving a first wireless signal including a waveform of vibration;
receiving a second wireless signal in a predetermined area, the second wireless signal including control information for controlling ON/OFF of the vibration;
generating, on the basis of the control information included in the received second wireless signal, the waveform of the vibration from the received first wireless signal; and
producing the vibration according to the generated waveform.

11. A transmitting apparatus comprising:
a waveform generating unit that generates a waveform of vibration for vibrating a receiving apparatus;
a first wireless transmitting unit that modulates the waveform generated by the waveform generating unit and transmits the modulated waveform as a first wireless signal;
a control information generating unit that generates control information for controlling ON/OFF of the vibration; and
a second wireless transmitting unit that modulates the control information generated by the control information generating unit and transmits, to a predetermined area, the modulated control information as a second wireless signal, wherein the waveform generating unit, the first wireless transmitting unit, the control information generating unit, and the second wireless transmitting unit are each implemented via at least one processor.

12. The transmitting apparatus according to claim 11, wherein the first wireless transmitting unit transmits the first wireless signal by broadcasting.

13. The transmitting apparatus according to claim 11, wherein the second wireless transmitting unit transmits the second wireless signal by using an IR signal.

14. The transmitting apparatus according to claim 11, wherein the second wireless transmitting unit transmits the second wireless signal by using an ultrasonic signal.

15. The transmitting apparatus according to claim 11, wherein the first wireless signal includes information indicating presence or absence of place restriction for generating the waveform of the vibration, which is controlled by the control information.

16. The transmitting apparatus according to claim 11, wherein the receiving apparatus is formed to be wearable and worn on a user.

17. The transmitting apparatus according to claim 11, further comprising a projector that projects a video in a projection area spread in a same direction as the predetermined area.

18. A transmitting method comprising:
generating, by a transmitting apparatus, a waveform of vibration for vibrating a receiving apparatus;
modulating, by the transmitting apparatus, the waveform generated and transmitting the modulated waveform as a first wireless signal;
generating, by the transmitting apparatus, control information for controlling ON/OFF of the vibration; and
modulating, by the transmitting apparatus, the control information generated and transmitting, to a predetermined area, the modulated control information as a second wireless signal.

19. A non-transitory computer-readable medium having embodied thereon a program, which when executed by a computer causes the computer to execute a method, the method comprising:
generating a waveform of vibration for vibrating a receiving apparatus;
modulating the generated waveform and transmitting the modulated waveform as a first wireless signal;
generating control information for controlling ON/OFF of the vibration; and
modulating the generated control information unit and transmitting, to a predetermined area, the modulated control information as a second wireless signal.

\* \* \* \* \*